US008780458B2

(12) United States Patent
Sano et al.

(10) Patent No.: US 8,780,458 B2

(45) Date of Patent: Jul. 15, 2014

(54) IMAGING LENS, IMAGE PICKUP APPARATUS, AND PORTABLE TERMINAL

(75) Inventors: Eigo Sano, Hino (JP); Maiko Nishida, Sakai (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/521,398

(22) PCT Filed: Dec. 22, 2010

(86) PCT No.: PCT/JP2010/073145

§ 371 (c)(1), (2), (4) Date: Jul. 10, 2012

(87) PCT Pub. No.: WO2011/086827

PCT Pub. Date: Jul. 21, 2011

(65) Prior Publication Data

US 2012/0293704 A1 Nov. 22, 2012

(30) Foreign Application Priority Data

Jan. 13, 2010 (JP) ................................ 2010-004577

(51) Int. Cl.
*G02B 3/02* (2006.01)
*G02B 13/18* (2006.01)

(52) U.S. Cl.
USPC .......................................................... 359/714

(58) Field of Classification Search
USPC .......................................................... 359/714
See application file for complete search history.

(56) References Cited

U.S. PATENT DOCUMENTS

2007/0081259 A1* 4/2007 Noda ............................ 359/774
2010/0134904 A1* 6/2010 Tsai ............................. 359/764

FOREIGN PATENT DOCUMENTS

| | | |
|---|---|---|
| JP | 2007-264180 | 10/2007 |
| JP | 2007-279282 | 10/2007 |
| JP | 2009-294527 | 12/2009 |
| JP | 2009-294528 | 12/2009 |
| JP | 2010-152042 | 7/2010 |

* cited by examiner

*Primary Examiner* — Scott J Sugarman
*Assistant Examiner* — Mustak Choudhury
(74) *Attorney, Agent, or Firm* — Cozen O'Connor

(57) ABSTRACT

Provided is an imaging lens, and also provided are an image pickup apparatus and a portable terminal both equipped with the imaging lens. The imaging lens includes in order: a positive first lens having a convex object-side surface; a negative second lens having a concave image-side surface; a negative meniscus-shaped third lens having a convex object-side surface; a positive fourth lens having a convex image-side surface; and a negative fifth lens having a concave image-side surface. The image-side surface of the fifth lens is aspherical and has an inflection point at a position of the optical axis. The third and the fourth lenses are integrally moved to focus, and the following conditional relation is satisfied: $0.75<f34/f<1.30$, where f34 is the combined focal length of the third lens and the fourth lens, and f is the focal length of the entire system of the imaging lens.

13 Claims, 15 Drawing Sheets

IMAGING LENS, IMAGE PICKUP APPARATUS, AND PORTABLE TERMINAL

RELATED APPLICATIONS

This is a U.S. National Phase Application under 35 USC 371 of International Application PCT/JP2010/073145 filed on Dec. 22, 2010.

This application claims the priority of Japanese Application No. 2010-004577 filed Jan. 13, 2010, the entire content of which is hereby incorporated by reference.

TECHNICAL FIELD

The present invention relates to imaging lenses suitable for a small sized image pickup apparatus using a solid state image sensor such as a CCD image sensor or a CMOS image sensor, image pickup apparatuses, and portable terminals using the same.

BACKGROUND ART

In recent years, along with improvement in performance and downsizing of imaging elements using solid state image sensors such as a CCD (Charge Coupled Device) image sensor or a CMOS(Complementary Metal Oxide Semiconductor) image sensor, portable phones and portable information terminals equipped with image pickup apparatuses are becoming widely used. Thus, imaging lenses to be built in these image pickup apparatuses are required to be further downsized and advanced in performance. As imaging lenses for such applications, there is proposed a five element imaging lens for the reason that it can have higher performance than a three element lens or a four element lens.

There is disclosed as the five element imaging lens an imaging lens constituted by, in order from an object side: a first lens having a positive refractive power, a second lens having a negative refractive power; a third lens having a positive refractive power; a fourth lens having a negative refractive power; and a fifth lens having negative refractive power (see Patent Document 1, for example).

In addition, there is disclosed an imaging lens, in order from an object side: a first lens having a negative refractive power; a second lens having a positive refractive power; a third lens having a negative refractive power; a fourth lens having a positive refractive power; and a fifth lens having negative refractive power (see Patent Document 2, for example).

RELATED ART DOCUMENT

Patent Document

Patent Document 1: Japanese Laid-Open Patent Application Publication No. 2007-264180

Patent Document 2: Japanese Laid-Open Patent Application Publication No. 2007-279282

SUMMARY OF THE INVENTION

Object of the Invention

However, in the imaging lens disclosed in Patent Document 1, the first lens through the third lens bear almost all the refractive power of the entire lens system, and the fourth lens and the fifth lens have only a function as an image plane correction lens having a weak refractive power, and aberration correction is thus not sufficient, and in addition, there is an issue that, in the case of further shortening the overall lens length, the lens cannot deal with increase in pixel number because of decrease in performance.

In addition, in the imaging lens disclosed in Patent Document 2, since the front group made up of a first lens and a second lens is made to have spherical surfaces, the spherical aberration coefficient and the somatic aberration are not sufficiently corrected, whereby good performance cannot be obtained. In addition, both of the front group and the rear group containing the third lens and after have positive refractive powers; thus, the principal point position of the optical system is more on the image side and the back focus is accordingly longer than the telephoto type configuration having negative refractive power in the rear group, whereby it is disadvantageous for downsizing.

The present invention has been made in view of these issues, and an object of the invention is to provide an imaging lens having a five-lens structure, which is a smaller than the conventional type of lens, and the aberrations of which are well corrected.

Regarding how small the small imaging lens should be, the present invention aims to downsize such that following Expression (8) is satisfied. By satisfying this range, the whole of the image pickup apparatus can be downsized.

$$L/2Y<1.00 \quad (8)$$

where:

L is a distance on the optical axis between the most object-side lens surface of the entire imaging lens system and the image-side focal point; and 2Y is an imaging surface diagonal length of a solid state image sensor (a diagonal length of a rectangular effective pixel region of the solid state image sensor).

Here, the image-side focal point is an image point of a parallel light bean which enters the imaging lens and is parallel to the optical axis.

In addition, if a parallel plate such as an optical low pass filter, an infrared cut filter, and a cover glass of a solid state image sensor package is disposed between the most image-side surface of the imaging lens and the image-side focal position, the value of the above L is calculated by using an air equivalent length for the thickness of the parallel plate.

Further, it is more desirable to satisfy the following Expression (8').

$$L/2Y<0.90 \quad (8')$$

Means for Solving the Object

An imaging lens of item 1 for forming a subject image on a photoelectric conversion section of a solid state image sensor, the imaging lens comprising in order from an object side:

a first lens having positive refractive power and a convex surface toward the object side;

a second lens having negative refractive power and a concave surface toward an image side;

a meniscus third lens having negative refractive power and a convex surface toward the object side;

a fourth lens having positive refractive power and a convex surface toward the image side; and a fifth lens having negative refractive power and a concave surface toward the image side, wherein an image-side surface of the fifth lens has an aspherical shape and has a curvature changing point at a position other than an intersection point between the image-side surface and an optical axis; the first lens, the second lens, and the fifth lens are fixed with respect to an imaging surface; the third lens and the fourth lens are integrally moved in an optical axis direction to focus; and the following conditional expression is satisfied:

$$0.75<f34/f<1.30 \quad (1)$$

where:

f34 is a combined focal length of the third lens and the fourth lens; and f is an overall focal length of the imaging lens.

The basic structure present invention for realizing an imaging lens which is small and has well corrected aberrations is configured by a first lens having positive refractive power and a convex surface toward the object side; a second lens having negative refractive power and a concave surface toward an image side; a meniscus third lens having negative refractive power and a convex surface toward the object side; a fourth lens having positive refractive power and a convex surface toward the image side; and a fifth lens having negative refractive power and a concave surface toward the image side. This lens structure having, in order from the object side, a positive lens group containing the first lens, the second lens, the third lens, and the fourth lens, and a negative fifth lens is so-called a telephoto type and has an advantage in shortening the overall imaging lens length.

In addition, since the three lenses in the five-lens structure are made to be negative lenses to have more number of surfaces having a diverging effect, the Petzval sum is easily corrected, whereby an imaging lens can be realized which has excellent imaging properties even in the peripheral area of the field.

In addition, since the image-side surface of the fifth lens disposed on the most image side is made aspherical, aberrations on the peripheral area of the field are well corrected. Further, since it is made to have an aspherical shape having a curvature changing point at a position other than the intersection point with the optical axis, it is easy to ensure telecentricity of the light beam on the image side.

Here, the "curvature changing point" is, on the curve of the sectional view of the lens within the effective radius, a point on the aspherical surface and is a point at which the tangential plane of the crest of the aspherical surface is perpendicular to the optical axis.

Since the first lens, the second lens, and the fifth lens are fixed, and only the third lens and the fourth lens are movable in the optical axis direction, focusing is allowed to be performed without deteriorating the spherical aberration coefficient, the chromatic aberration, the curvature of field, and the like. In addition, since the travel distance for focusing is made smaller than the so-called entire lens focusing, in which the entire imaging lens is integrally extended, the actuator is minimized and the entire length is constant, whereby the optical unit is allowed to be super compact. Further, dusts are prevented from entering the lens unit, and it is thus possible to cut cost due to elimination of a process and to reduce the environmental burden due to reduction of defective products.

The conditional expression (1) is used for appropriately setting the combined focal length of the third lens and the fourth lens, which are a focusing group. When the value of the conditional expression (1) is lower than the upper limit, the refractive power of the focusing group is kept appropriate, and the travel distance for focusing is thus kept small. On the other hand, when the value of the conditional expression (1) is higher than the lower limit, the refractive power of the third lens and the fourth lens is prevented from getting too strong, and the variation of aberration is thus kept small.

In addition, it is more desirably to satisfy the following conditional expression.

$$0.80<f34/f<1.25 \quad (1')$$

An imaging lens of item 2 is the imaging lens of item 1, wherein the following conditional expression is satisfied:

$$1.35<f12/f<1.95 \quad (2)$$

where:

f12 is a combined focal length of the first lens and the second lens.

The conditional expression (2) is used to appropriately set the combined focal length of the first lens and the second lens. When the value of the conditional expression (2) is lower than the upper limit, the positive combined focal length of the first lens and the second lens is kept appropriate, whereby the principal point position of the overall optical system can be located more on object side, thereby shortening the overall length of the imaging lens. On the other hand, when the value of the conditional expression (2) is higher then the lower limit, the positive combined focal length of the first lens and the second lens is prevented from getting too small, the high-order of spherical aberration coefficient and comatic aberration created in the first lens and the second lens can be kept small, and the variation of an image plane due to production error is kept small by keeping the refractive power of each of the first lens and the second lens at an appropriate level.

Further, it is more desirable to satisfy the following conditional expression.

$$1.40<f12/f<1.85 \quad (2')$$

An imaging lens of item 3 is the imaging lens of item 1 or 2, wherein the following conditional expression is satisfied:

$$0.1<\Sigma L12/f<0.4 \quad (3)$$

where:

ΣL12 is a distance on the optical axis from an object-side surface of the first lens to an image-side surface of the second lens.

The conditional expression (3) is used to set the distance on the optical axis from the object-side surface of the first lens to the image-side surface of the second lens. Although the first lens and the second lens are easily made thinner for improvement in performance and shortening the overall length, their formability gets lower as they get thinner. Thus, by satisfying the range of the conditional expression (3), the overall length can be shortened, the performance can be improved, and the formability of the lens can be ensured.

Further, it is more desirable to satisfy the following conditional expression.

$$0.15<\Sigma L12/f<0.30 \quad (3')$$

An imaging lens of item 4 is the imaging lens of any one of items 1 to 3, wherein an image-side surface of the third lens has an aspherical shape and has a curvature changing point at a position other than an intersection point between the image-side surface of the third lens and the optical axis.

When the image-side surface of the third lens is made to have an aspherical shape and to have a curvature changing point, the decrease in performance while focusing can be kept small.

An imaging lens of item 5 is the imaging lens of any one of items 1 to 4, wherein the following conditional expression is satisfied:

$$0.15<|P3|/P<0.55 \quad (4)$$

where:

P3 is a refractive power of the third lens; and

P is an overall refractive power of the imaging lens.

The conditional expression (4) is used to appropriately set the refractive power of the third lens. When the value of the conditional expression (4) is lower than the upper limit, the negative refractive power of the third lens is prevented from getting too strong and the variation in performance while focusing can be kept small. On the other hand, when the value of the conditional expression (4) is higher than the lower limit, it is advantageous for shortening the overall length since the negative refractive power of the third lens is kept appropriate.

Further, it is more desirable to satisfy the following conditional expression.

$$0.2<|P3|/P<0.5 \quad (4')$$

An imaging lens of item 6 is the imaging lens of any one of items 1 to 5, wherein the following conditional expression is satisfied:

$$0.65<d25/f<0.95 \quad (5)$$

where:

d25 is a distance on the optical axis from an image-side surface of the second lens to an object-side surface of the fifth lens.

The conditional expression (5) is used to define the distance on the optical axis between the second lens and the fifth lens fixed to the imaging surface while focusing and to appropriately set the clearance while focusing. When the value of the conditional expression (5) is lower than the upper limit, the overall length of the imaging lens is prevented from increasing in association with the increase in the focusing stroke. On the other hand, when the value of the conditional expression (5) is higher than the lower limit, the clearance is kept appropriate while focusing.

Further, it is more desirable to satisfy the following conditional expression.

$$0.7<d25/f<0.9 \quad (5')$$

An imaging lens of item 7 is the imaging lens of any one of items 1 to 6, wherein an aperture stop of the imaging lens is disposed between the first lens and the second lens.

When the aperture stop is located between the first lens and the second lens, the peripheral marginal light passing through the object-side surface of the first lens is not refracted at too large an angle; thus, downsizing of the imaging lens can be realized and the aberrations can be well corrected.

An imaging lens of item 8 is the imaging lens of any one of items 1 to 7, wherein an image-side surface of the second lens has an aspherical shape, whose negative refractive power at a position is weaker as the position is farther from the optical axis.

When the second lens has an image-side surface having an aspherical shape in which the negative refractive power is weaker at the position which is farther from the center, the light is not raised too high on the peripheral area, the off-axis aberrations can be well corrected, and good telecentricity can be secured on the peripheral area.

An imaging lens of item 9 is the imaging lens of any one of items 1 to 8, wherein the following conditional expression is satisfied:

$$15<\nu 2<31 \quad (6)$$

where:

ν2 is an Abbe number of the second lens.

The conditional expression (6) is used to appropriately set the Abbe number of the second lens. When the value of the conditional expression (6) is lower than the upper limit, the dispersion of the second lens can be made appropriately large, the refractive power of the second lens can be kept low, and the chromatic aberrations such as axial chromatic aberration and chromatic aberration of magnification can be well corrected. On the other hand, the value of the conditional expression (6) is upper than the lower limit, the lens can be made of more easily obtainable material.

Further, it is more desirable to satisfy the following conditional expression.

$$15<\nu 2<24 \quad (6')$$

Further, it is more desirable to satisfy the following conditional expression.

$$15<\nu 2<21 \quad (6'')$$

An imaging lens of item 10 is the imaging lens of any one of items 1 to 9, wherein the following conditional expression is satisfied:

$$1.60<n2<2.10 \quad (7)$$

where:

n2 is a refractive index of the second lens.

The conditional expression (7) is used to well correct the chromatic aberration and the curvature of field of the overall imaging lens system. When the value of the conditional expression (7) is upper than the lower limit, the refractive power of the second lens having a relatively large dispersion can be kept appropriately, and the chromatic aberration and the curvature of field can be thus corrected well. On the other hand, when the value of the conditional expression (7) is lower than the upper limit, the lens can be made of more easily obtainable material.

Further, it is more desirable to satisfy the following conditional expression.

$$1.63<n2<2.00 \quad (7')$$

Further, it is more desirable to satisfy the following conditional expression.

$$1.649<n2<2.00 \quad (7'')$$

An imaging lens of item 11 is the imaging lens of any one of items 1 to 10, wherein the imaging lens is all made of plastic material.

In recent years, for the purpose of downsizing the overall size of a solid-state image pickup apparatus, solid state image sensors have been developed which have a smaller pixel pitch accordingly have a smaller size of the imaging surface even when the pixel number is the same. Since imaging lenses for these solid state image sensors having a small imaging surface size need to have a relatively shorter overall focal length, each lens has a relatively small radius of curvature and outer diameter. Therefore, if all the lenses are made of plastic by an injection molding method, the lenses can be mass produced at lower cost than the glass lenses made by a polishing process requiring time and effort even when they have a small radius of curvature and outer diameter. In addition, since plastic lenses can be pressed at such low temperatures, a casting mold is less worn; thus, change of casting mold and maintenance are less frequently done, thereby cutting cost.

An image pickup apparatus of item 12 is an image pickup apparatus, comprising: a solid state image sensor configured to photoelectrically convert the subject image; and the imaging lens of any one of items 1 to 11. Using the imaging lens of the present invention can provide smaller and higher performance image pickup apparatuses A portable terminal of item 13 is a portable terminal, comprising: the image pickup apparatus of item 12. Using the image pickup apparatus of the present invention can provide smaller and higher performance portable terminals.

Advantage of the Invention

According to the present invention, there can be provided an imaging lens having a five-lens structure which is smaller than conventional types and whose aberrations are well corrected, and there can be provided an image pickup apparatus and a portable terminal equipped with the imaging lens.

BEST MODE FOR CARRYING OUT THE INVENTION

Figure 1:
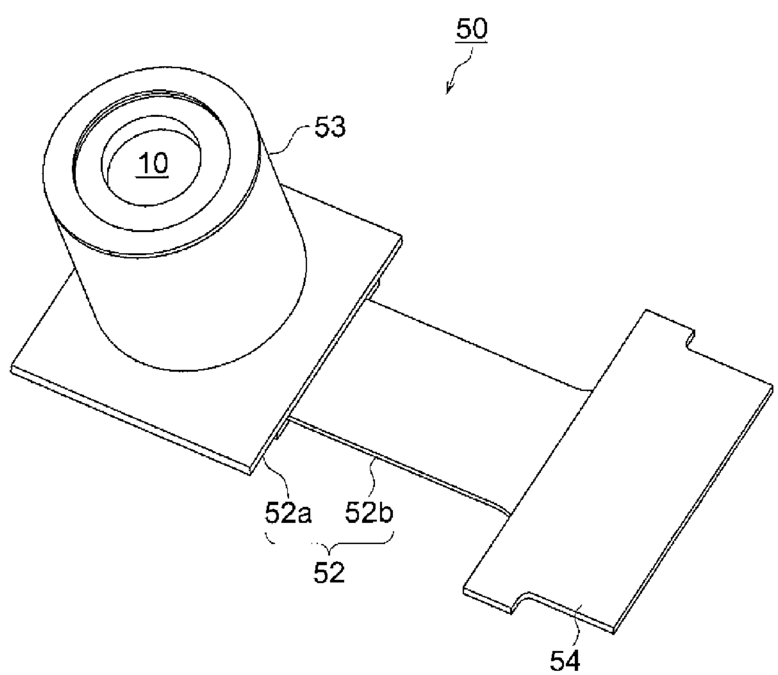
FIG. 1 is a perspective view of an image pickup apparatus 50 according to an embodiment.

Embodiments of the present invention are described below with reference to the drawings. FIG. 1 is a perspective view of an image pickup apparatus 50 according to an embodiment, and FIG. 2 is a diagram schematically showing a cross section along the optical axis of an imaging lens of the image pickup apparatus 50.

Figure 2:
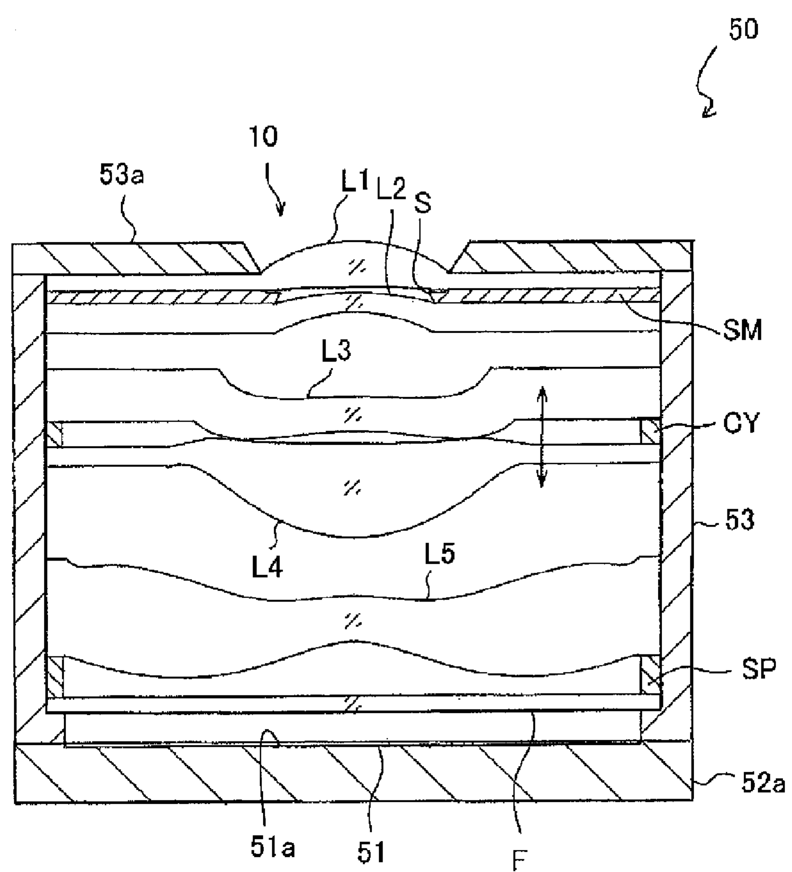
FIG. 2 is a diagram schematically showing a sectional view along the optical axis of an imaging lens of the image pickup apparatus 50.

As shown in FIG. 1 and FIG. 2, the image pickup apparatus 50 includes: a CMOS imaging element 51 having a photoelectric conversion section 51*a* as a solid state image sensor; an imaging lens 10 for allowing the photoelectric conversion section 51*a* of the imaging element 51 to pick up an image of a subject; a substrate 52 holding the imaging element 51 and having a terminal 54 for external connection (also referred to as an "external connection terminal") (see FIG. 1) for transmitting/receiving electric signals of the imaging element 51; and a chassis 53 as a lens barrel which is made of light shielding material and has an opening section for letting light in from an object side, wherein these elements are integrally formed.

The imaging element 51 has the photoelectric conversion section 51*a*, in which pixels (photoelectric conversion elements) are two-dimensionally arranged, formed as a light receiving section on the central part of the light receiving plane, and has a signal processing circuit (not shown) formed on its periphery. This signal processing circuit is configured with: a drive circuit section for sequentially driving the pixels to obtain signal charges; an A/D conversion section for converting the signal charges into digital signals; and a signal processing section for generating an image signal output by using these digital signals. In addition, in the vicinity of the periphery of the light receiving side plane of the imaging element 51, there are a plurality of pads (not shown), which are coupled to the substrate 52 through wires W. The imaging element 51 converts the signal charges form the photoelectric conversion section 51*a* into the image signal such as a digital YUV signal and outputs the converted signal to a predetermined circuit on the substrate 52 through the wires W. Here, Y is a brightness signal, U (=R−Y) is a color-difference signal between red and the brightness signal, and V (=B−Y) is a color-difference signal between blue and the brightness signal. However, the imaging element is not limited to the CMOS image sensor, and may be other devices such as CCD may be used.

The substrate 52 is equipped with: a supporting plate 52*a* which supports the imaging element 51 and the chassis 53 on its upper surface; and a flexible substrate 52*b* one end part of which is connected to the lower surface (opposite surface to the imaging element 51) of the supporting plate 52*a*.

Not shown, but the supporting plate 52*a* has a plurality of pads for communicating signals and is connected to the imaging element 51 through not shown wires.

With reference to FIG. 1, in the flexible substrate 52*b*, its one end part is connected to the supporting plate 52*a* as described above, and the supporting plate 52*a* is connected to an external circuit (such as a control circuit of an upper level device in which the image pickup apparatus is assembled) through an external connection terminal 54 provided on its the other end part, voltages and a clock signal used to drive the imaging element 51 are allowed to be supplied from the external circuit, and the digital YUV signal can be output to the external circuit. Further, the flexible substrate 52*b* has flexibility or deformability at its intermediate part in the longitudinal direction, and its deformation gives freedom of direction and position to the external connection terminal 54 with respect to the supporting plate 52*a*.

With reference to FIG. 2, the chassis 53 is fixed on the surface of the supporting plate 52*a* of the substrate 52 on which the imaging element 51 is disposed such that the chassis 53 covers the imaging element 51. In particular, the part of the chassis 53 on the side of the imaging element 51 is widely opened so as to surround the imaging element 51, the other end part (object side end part) forms a flange 53*a* having a small opening, and the end part (image-side and part) on the side of the imaging element 51 is fixed on and in connection with the supporting plate 52*a*. However, the end part of the chassis 53 on the side of the imaging element 51 may be fixed on and in connection with the periphery of the photoelectric conversion section 51*a* on the imaging element 51.

A parallel plate F used as an IR (infrared light) cut filter is securely provided between the imaging lens 10 and the imaging element 51 in the chassis 53 disposed with the flange 53*a* facing toward the object side, which flange 53*a* has the small opening (opening section for letting light in) formed therein.

The imaging lens 10 is made up of, in order from an object side: a fast lens L1 having positive refractive power and a convex surface toward an object side; an aperture stop S; a second lens L2 having negative refractive power and a concave surface toward an image side; a meniscus third lens L3 having negative refractive power and a convex surface toward the object side; a fourth lens L4 having positive refractive power and a convex surface toward the image side; and a fifth lens L5 having negative refractive power and a concave surface toward the image side. The image-side surface of the fifth lens L5 has an aspherical shape and a curvature changing point at a position other than the intersection point between the image-side surface and the optical axis. The first lens L1 and the second lens L2 are fixed on the flange 53*a*, being stacked on each other with a member SM there between, where the member SM forms the aperture stop S. In addition, the fifth lens L5 is fixed on the chassis 53 through a cylindrical spacer SP. The third lens L3 and the fourth lens L4 are coupled with a cylindrical connecting member CY between them, and they are integrally driven in the optical axis direction by a not shown actuator to focus. Here, the imaging lens 10 satisfies the conditional expression:

$$0.75 < f34/f < 1.30 \quad (1)$$

where:

f34 is a combined focal length of the third lens L3 and the fourth lens L4; and f is an overall focal length of the imaging lens 10.

The lenses L1 to L5 are preferably plastic. In FIG. 12, the upward direction is the object side, and the downward direction is the image side.

Not shown, but on further object side of the first lens L1, there may be provided an incident light blocking mask for reducing unwanted light entering from outside. The aperture stop S is a member for defining an F number of the entire imaging lens. The parallel plate F as an IR cut filter is formed in an approximately rectangular shape or a circular shape, for example.

Figure 3A:
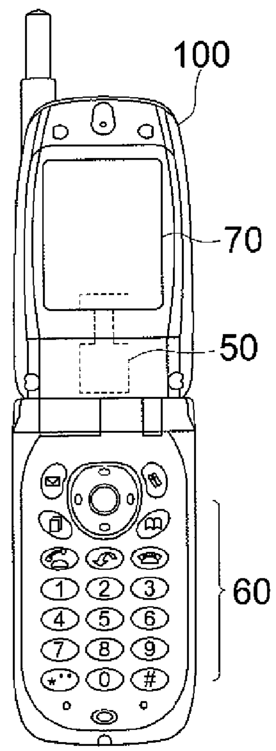
FIG. 3*a* is a front view of a portable phone equipped with an image pickup apparatus.
Figure 3B:
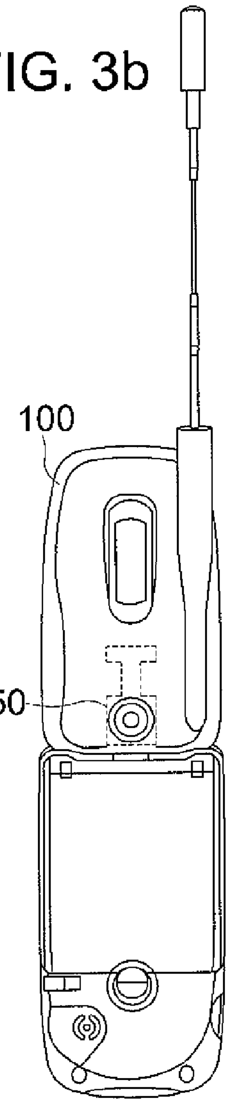
FIG. 3*b* is a rear view of the portable phone equipped with the image pickup apparatus.
Figure 4:
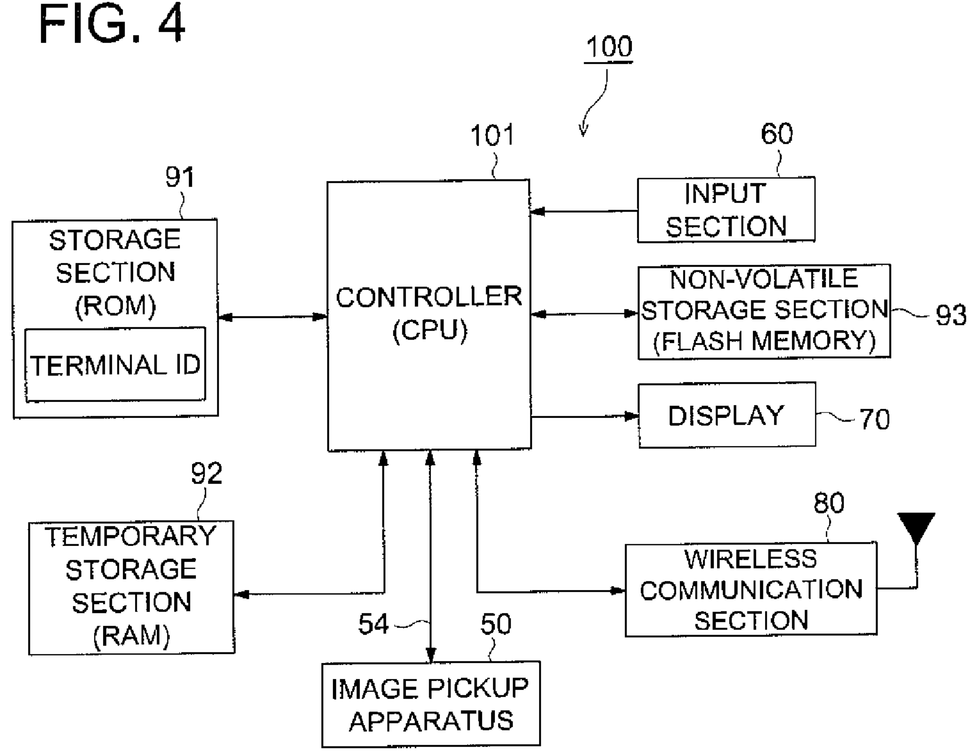
FIG. 4 is a diagram of a control block of a mobile phone or FIGS. 3*a* and 3*b;*

The operation of the pickup apparatus 50 will be described. FIG. 3 shows the mobile telephone 100, as an example of a portable terminal, equipped with the image pickup apparatus 50. FIG. 4 is a block diagram of the control of the mobile telephone 100.

The image pickup apparatus 50 is disposed under the liquid crystal display with the object-side end face of the chassis 53 attached on the back face (see FIG. 3*b*) of the mobile telephone 100, for example.

The external connection terminal 54 of the image pickup apparatus 50 is connected to the controller 101 (the allow in FIG. 4), and outputs the image signal including the brightness signal and the color-difference signal of the mobile telephone 100 to the controller 101 side.

On the other hand, as shown in FIG. 4, the mobile telephone 100 is equipped with: a controller (CPU) 101 for integrally controlling different sections and executing programs for different processes; an input section 60 for inputting numbers and the like; a display 70 for displaying predetermined data and taken images; a wireless communication section 80 for realizing different communications of information with an outer server; a storage section (ROM) 91 storing a system program of the mobile telephone 100, different processing programs, and necessary data including a terminal ID datum; and a temporary storage section (RAM) 92 which temporarily stores different processing programs and data executed in the controller 101, or processed data, and image data taken by the image pickup apparatus 50, and the like, and which is used as a work space.

Further, the image signal input from the image pickup apparatus 50 is subjected to a predetermined process and then stored in a volatile storage section (flash memory) 93 by the controller 101 of the mobile telephone 100, or displayed on the display 70, and further output to the outside as an image signal through the wireless communication section 80. Not shown, but the mobile telephone 100 is equipped with a microphone, a speaker, or the like for inputting/outputting voice.

EXAMPLES

Examples of the imaging lens of the present invention are described below. Symbols used for the examples are as follows.

f: Overall focal length of the imaging lens fB: Back focus

F: F number

2Y: Diagonal length of the solid state image sensor

ENTP: Entrance pupil position (a distance from the first surface to the entrance pupil position)

EXTP: Exit pupil position (a distance from the imaging surface to the exit pupil position)

H1: Front principal point position (a distance from the first surface to the front principal point position)

H2: Rear principal point position (a distance from the final surface to the rear principal point position)

R: Radius of curvature

D: Axial surface separation

Nd: Refractive index of a lens material for the d line

νd: Abbe number of a lens material

In the examples, a surface number having "*" on its back has an aspherical shape, and its aspherical shape is defined by the following Formula 1, where the origin is set at a surface apex, the X axis is defined in the optical axis direction, and the height in the direction vertical to the optical axis is supposed to be h.

$$X = \frac{h^2/R}{1+\sqrt{1-(1+K)h^2/R^2}} + \sum A_i h^i \quad \text{(Formula 1)}$$

where:

Ai is an i-th order aspherical coefficient;

R is a radius of curvature; and

K is a conical coefficient.

In addition, the power of 10 (for example, $2.5\times10^{-02}$) is represented by E (for example, 2.5E-02) (including lens data of the lenses) hereinafter. Further, the surface numbers of the lenses are assigned in order starting with the first surface for the object-side surface of the first lens. The unit of the numbers in the examples representing lengths is mm.

Example 1

The lens data of an imaging lens of Example 1 are as follows.

f = 3.68 mm, fB = 0.29 mm, F = 2.45, 2Y = 5.53 mm
ENTP = 0.37 mm, EXTP = −2.48 mm,
H1 = −0.84 mm, H2 = −3.4 mm

| Surface No. | R (mm) | D (mm) | Nd | νd | Effective Radius (mm) |
|---|---|---|---|---|---|
| 1* | 1.551 | 0.43 | 1.54470 | 56.2 | 0.88 |
| 2* | 48.237 | 0.05 | | | 0.74 |
| 3 (aperture) | ∞ | 0.00 | | | 0.69 |
| 4* | 2.606 | 0.18 | 1.63200 | 23.4 | 0.71 |
| 5* | 1.411 | 0.79 | | | 0.74 |
| 6* | 5.418 | 0.32 | 1.58300 | 30.0 | 1.17 |
| 7* | 2.920 | 0.12 | | | 1.49 |
| 8* | −232.117 | 0.88 | 1.54470 | 56.2 | 1.70 |
| 9* | −1.563 | 0.55 | | | 1.74 |
| 10* | 2.244 | 0.43 | 1.53050 | 55.7 | 2.35 |
| 11* | 0.97 | 0.50 | | | 2.64 |
| 12 | ∞ | 0.15 | 1.51630 | 64.1 | 2.80 |
| 13 | ∞ | 2.84 | | | |

Aspherical Coefficient:

1st Surface

K = 0.41415E+00
A4 = −0.37689E−02
A6 = 0.17668E−01
A8 = −0.23233E−01
A10 = 0.33420E−02
A12 = 0.45468E−01

2nd Surface

K = 0.50000E+02
A4 = 0.56716E−01
A6 = −0.23292E−01
A8 = 0.21713E−01
A10 = −0.15444E−01
A12 = 0.64215E−01

4th Surface

K = −0.11747E+02
A4 = 0.59161E−02
A6 = 0.38159E−01

-continued

A8 = −0.45582E−01
A10 = 0.24607E−02
A12 = 0.17962E−01

5th Surface

K = −0.39137E+01
A4 = 0.50498E−01
A6 = 0.84768E−01
A8 = −0.61733E−01
A10 = −0.44361E−02
A12 = 0.59071E−01

6th Surface

K = 0.80090E+01
A4 = −0.13885E+00
A6 = 0.17173E−01
A8 = −0.12066E−01
A10 = 0.13749E−01
A12 = −0.12510E−01

7th Surface

K = −0.14055E+02
A4 = −0.59943E−01
A6 = −0.25211E−02
A8 = 0.48573E−02
A10 = −0.25635E−02
A12 = −0.53913E−04

8th Surface

K = 0.94435E+04
A4 = −0.26923E−01
A6 = −0.69462E−02
A8 = 0.55880E−02
A10 = 0.20439E−02
A12 = −0.65770E−03

9th Surface

K = −0.21964E+01
A4 = −0.68710E−01
A6 = 0.39030E−01
A8 = −0.34380E−01
A10 = 0.18717E−01
A12 = −0.29798E−02
A14 = 0.23194E−04

10th Surface

K = −0.26589E+02
A4 = −0.18864E+00
A6 = 0.75124E−01
A8 = −0.10881E−01
A10 = −0.20196E−03
A12 = 0.21077E−03
A14 = −0.15301E−04

11th Surface

K = −0.48047E+01
A4 = −0.91556E−01
A6 = 0.36408E−01
A8 = −0.10524E−01
A10 = 0.19471E−02
A12 = −0.19775E−03
A14 = 0.82707E−05

Data of Each Single Lens:

| Lens | Front Surface | Focal Length (mm) |
|---|---|---|
| 1 | 1 | 2.933 |
| 2 | 4 | −5.172 |
| 3 | 6 | −11.406 |
| 4 | 8 | 2.884 |
| 5 | 10 | −3.698 |

Figure 5:
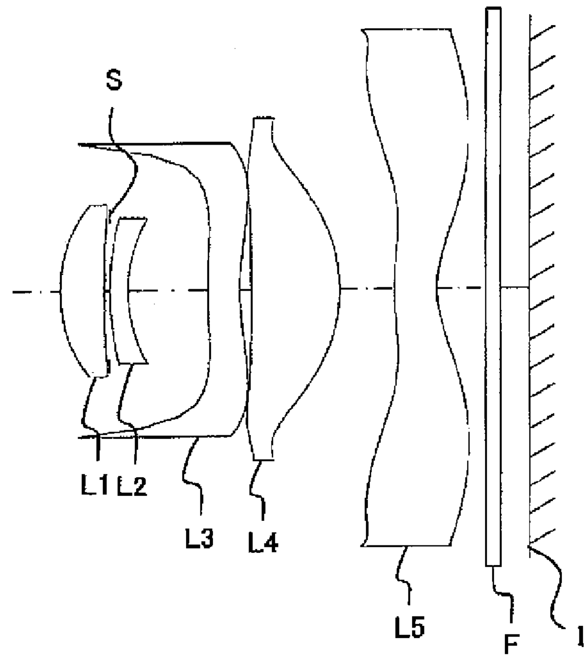
FIG. 5 is a cross section of an imaging lens of Example 1 in an optical axis direction.
Figure 6A:
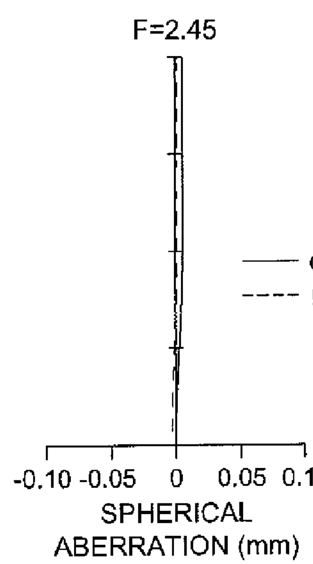
FIG. 6*a* is an aberration diagram of spherical aberration coefficient of Example 1.
Figure 6B:
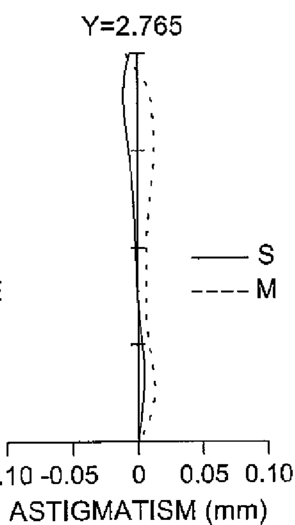
FIG. 6*b* is an aberration diagram of astigmatism of Example 1.
Figure 6C:
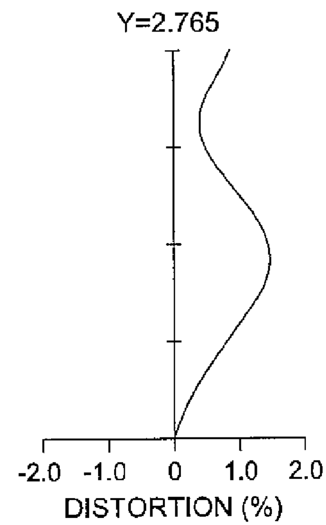
FIG. 6*c* is an aberration diagram of distortion of Example 1.
Figure 6D:
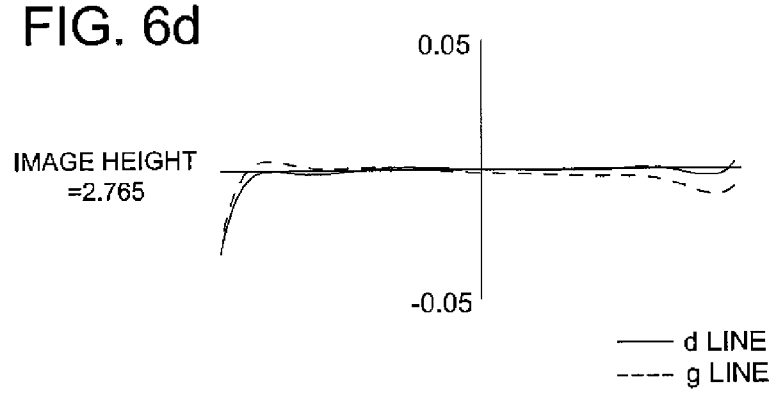
FIG. 6*d* and 6*e* are an aberration diagram of meridional comatic aberration of Example 1.
Figure 6E:
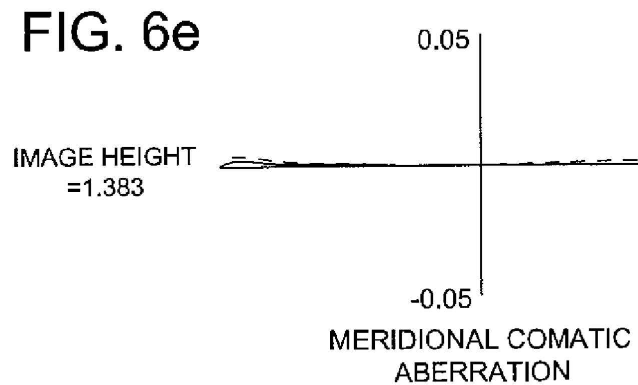

FIG. 5 is a cross sectional view of the lens of Example 1. In the drawing, L1 denotes the first lens, L2 denotes the second lens, L3 denotes the third lens, L4 denotes the fourth lens, L5 denotes the fifth lens, S denotes the aperture stop, and I denotes the imaging surface. Further, F denotes a parallel plate supposed to be an optical low pass filter, an IR cut filter, a cover glass of a solid state image sensor, or the like. FIGS. 6*a*-6*e* are aberration diagrams, and FIG. 6*a* shows a spherical aberration coefficient, FIG. 6*b* shows an astigmatism, FIG. 6*c* shows a distortion, and FIGS. 6*d*-6*e* show meridional comatic aberrations of Example 1. It should be noted that in the aberration diagrams below: in the spherical aberration coefficient diagrams, solid lines and broken lines denote the d line and the g line, respectively; and in the meridional comatic aberration diagrams and in the astigmatism diagrams, solid lines and the broken lines denote the sagittal image surface and the meridional image surface, respectively. In this example, all the lenses are made of plastic materials, the image-side surface of the fifth lens L5 has an aspherical shape and has a curvature changing point at a position other than the intersection point between the image-side surface and the optical axis; the first lens L1, the second lens L2, and the fifth lens L5 are fixed with respect to the imaging surface I; and the third lens L3 and the fourth lens L4 are integrally moved in the optical axis direction to focus.

Example 2

The lens data of an imaging lens of Example 2 are as follows.

f = 3.68 mm, fB = 0.23 mm, F = 2.45, 2Y = 5.53 mm
ENTP = 0.33 mm, EXTP = −2.44 mm,
H1 = −1.06 mm, H2 = −3.45 mm

| Surface No. | R (mm) | D (mm) | Nd | νd | Effective Radius (mm) |
|---|---|---|---|---|---|
| 1* | 1.630 | 0.38 | 1.54470 | 56.2 | 0.87 |
| 2* | 289.402 | 0.05 | | | 0.76 |
| 3 (aperture) | ∞ | 0.00 | | | 0.70 |
| 4* | 2.123 | 0.16 | 1.63200 | 23.4 | 0.72 |
| 5* | 1.251 | 0.84 | | | 0.75 |
| 6* | 2.405 | 0.22 | 1.63200 | 23.4 | 1.27 |
| 7* | 1.873 | 0.15 | | | 1.50 |
| 8* | 11.651 | 1.07 | 1.54470 | 56.2 | 1.78 |
| 9* | −1.663 | 0.52 | | | 1.81 |
| 10* | 3.807 | 0.42 | 1.53050 | 55.7 | 2.01 |
| 11* | 1.087 | 0.50 | | | 2.52 |
| 12 | ∞ | 0.15 | 1.51630 | 64.1 | 2.79 |
| 13 | ∞ | 2.83 | | | |

Aspherical Coefficient:

1st Surface

K = 0.38758E+00
A3 = −0.79256E−04
A4 = −0.41120E−03
A5 = −0.83837E−04
A6 = 0.24258E−01
A7 = −0.38553E−04
A8 = −0.55840E−01
A9 = −0.38330E−04
A10 = 0.57615E−01
A11 = −0.89253E−04
A12 = −0.11269E−03
A13 = −0.11847E−03
A14 = −0.93213E−04
A15 = −0.23363E−04
A16 = 0.10435E−03
A17 = 0.30267E−03
A18 = 0.58370E−03
A19 = 0.95866E−03
A20 = 0.14382E−02

2nd Surface

K = 0.11688E+05
A3 = 0.78044E−04
A4 = 0.64523E−01
A5 = −0.10025E−04
A6 = −0.43096E−01
A7 = −0.27277E−04

-continued

A8 = 0.15447E−01
A9 = −0.21365E−04
A10 = 0.20737E−01
A11 = 0.18645E−04
A12 = 0.65016E−04
A13 = 0.14053E−03
A14 = 0.25691E−03
A15 = 0.42854E−03
A16 = 0.67245E−03
A17 = 0.10082E−02
A18 = 0.14558E−02
A19 = 0.20347E−02
A20 = 0.27591E−02

4th Surface

K = −0.11502E+02
A3 = −0.25353E−04
A4 = 0.48847E−02
A5 = 0.90468E−04
A6 = 0.26715E−01
A7 = 0.66740E−04
A8 = −0.20277E−01
A9 = 0.59659E−04
A10 = −0.39191E−01
A11 = 0.14291E−03
A12 = 0.30994E−01
A13 = 0.34595E−03
A14 = 0.48795E−03
A15 = 0.64207E−03
A16 = 0.78217E−03
A17 = 0.86167E−03
A18 = 0.80252E−03
A19 = 0.47670E−03
A20 = −0.30949E−03

5th Surface

K = −0.42348E+01
A3 = 0.38016E−04
A4 = 0.43037E−01
A5 = −0.56534E−05
A6 = 0.87606E−01
A7 = 0.51468E−04
A8 = −0.63750E−01
A9 = −0.63624E−04
A10 = −0.23810E−01
A11 = −0.42183E−03
A12 = 0.58423E−01
A13 = −0.84396E−03
A14 = −0.93113E−03
A15 = −0.79172E−03
A16 = −0.26144E−03
A17 = 0.89731E−03
A18 = 0.30131E−02
A19 = 0.65426E−02
A20 = 0.12112E−01

6th Surface

K = −0.18342E+02
A3 = 0.41778E−05
A4 = −0.48312E−01
A5 = −0.38193E−04
A6 = −0.96949E−02
A7 = −0.26606E−04
A8 = −0.12945E−01
A9 = −0.18070E−04
A10 = 0.87777E−02
A11 = −0.11141E−04
A12 = −0.41238E−02
A13 = −0.57071E−05
A14 = −0.36144E−05
A15 = −0.19202E−05
A16 = −0.58196E−06
A17 = 0.44580E−06
A18 = 0.12065E−05
A19 = 0.17434E−05
A20 = 0.20957E−05

-continued

| 7th Surface |
|---|
| K = −0.12323E+02 |
| A3 = −0.34944E−04 |
| A4 = −0.37307E−01 |
| A5 = 0.25244E−04 |
| A6 = −0.91302E−02 |
| A7 = 0.15808E−04 |
| A8 = 0.30887E−03 |
| A9 = 0.69504E−05 |
| A10 = −0.35298E−03 |
| A11 = 0.25393E−05 |
| A12 = −0.96020E−05 |
| A13 = 0.98636E−06 |
| A14 = 0.66899E−06 |
| A15 = 0.47746E−06 |
| A16 = 0.35092E−06 |
| A17 = 0.25995E−06 |
| A18 = 0.19130E−06 |
| A19 = 0.13853E−06 |
| A20 = 0.98234E−07 |
| 8th Surface |
| K = −0.51455E+02 |
| A3 = −0.31118E−03 |
| A4 = −0.48264E−01 |
| A5 = −0.47324E−03 |
| A6 = 0.20205E−01 |
| A7 = 0.28379E−04 |
| A8 = 0.15644E−02 |
| A9 = 0.98589E−05 |
| A10 = −0.14560E−02 |
| A11 = −0.18184E−05 |
| A12 = 0.16318E−03 |
| A13 = −0.27316E−06 |
| A14 = 0.30243E−06 |
| A15 = 0.46773E−06 |
| A16 = 0.42559E−06 |
| A17 = 0.27960E−06 |
| A18 = 0.15599E−06 |
| A19 = 0.65441E−07 |
| A20 = 0.50289E−08 |
| 9th Surface |
| K = −0.45193E+01 |
| A3 = −0.44409E−02 |
| A4 = −0.92153E−01 |
| A5 = −0.66057E−04 |
| A6 = 0.49877E−01 |
| A7 = −0.14047E−03 |
| A8 = −0.33498E−01 |
| A9 = −0.33827E−04 |
| A10 = 0.17088E−01 |
| A11 = −0.77246E−05 |
| A12 = −0.32310E−02 |
| A13 = −0.12948E−05 |
| A14 = −0.13176E−04 |
| A15 = 0.12127E−06 |
| A16 = 0.42942E−04 |
| A17 = 0.31673E−06 |
| A18 = 0.26804E−06 |
| A19 = 020035E−06 |
| A20 = 0.13879E−06 |
| 10th Surface |
| K = −0.13347E+03 |
| A3 = 0.20147E−03 |
| A4 = −0.21643E+00 |
| A5 = 0.17775E−03 |
| A6 = 0.76646E−01 |
| A7 = 0.39422E−04 |
| A8 = −0.90012E−02 |
| A9 = 0.96611E−05 |
| A10 = −0.71512E−03 |
| A11 = 0.25773E−05 |
| A12 = 0.11141E−03 |
| A13 = 0.65098E−06 |
| A14 = 0.10212E−04 |
| A15 = 0.15066E−06 |
| A16 = 0.70068E−07 |
| A17 = 0.31823E−07 |
| A18 = 0.14079E−07 |
| A19 = 0.60392E−08 |
| A20 = 0.24910E−08 |
| 11th Surface |
| K = −0.60338E+01 |
| A3 = −0.72433E−03 |
| A4 = −0.86281E−01 |
| A5 = 0.13590E−03 |
| A6 = 0.30409E−01 |
| A7 = 0.20391E−04 |
| A8 = −0.81567E−02 |
| A9 = 0.11487E−05 |
| A10 = 0.13544E−02 |
| A11 = −0.39997E−08 |
| A12 = −0.12827E−03 |
| A13 = −0.70378E−08 |
| A14 = 0.52263E−05 |
| A15 = 0.21532E−09 |
| A16 = 0.54741E−09 |
| A17 = 0.43354E−09 |
| A18 = 0.26644E−09 |
| A19 = 0.14522E−09 |
| A20 = 0.73701E−10 |

Data of Each Single Lens:

| Lens | Front Surface | Focal Length (mm) |
|---|---|---|
| 1 | 1 | 3.007 |
| 2 | 4 | −5.197 |
| 3 | 6 | −15.996 |
| 4 | 8 | 2.750 |
| 5 | 10 | −3.031 |

Figure 7:
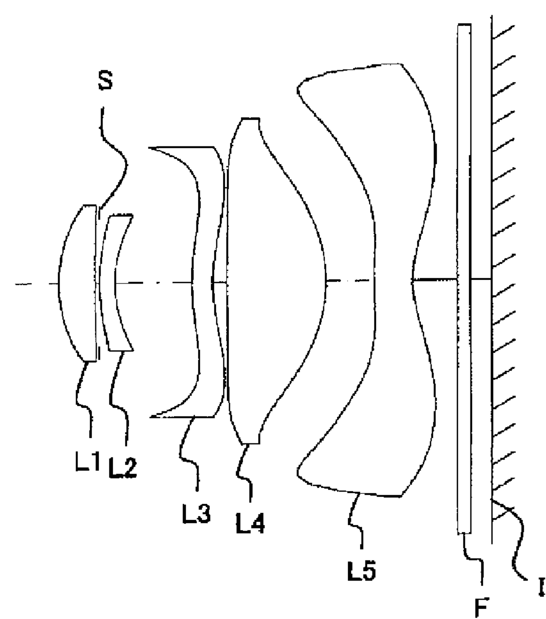
FIG. 7 is a cross section of an imaging lens of Example 2 in an optical axis direction.
Figure 8A:
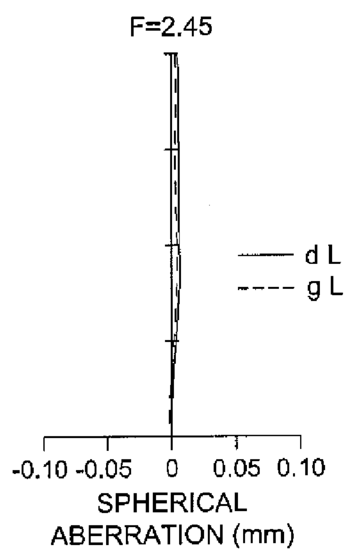
FIG. 8*a* is an aberration diagram of spherical aberration coefficient of Example 2.
Figure 8B:
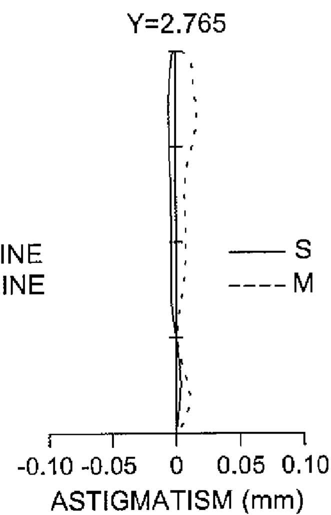
FIG. 8*b* is an aberration diagram of astigmatism of Example 2.
Figure 8C:
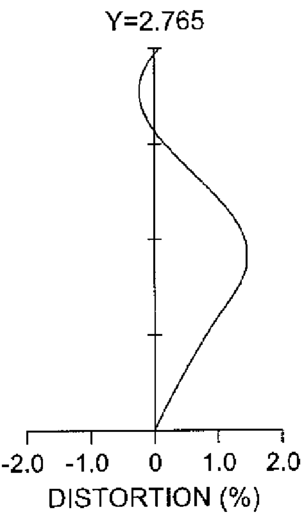
FIG. 8*c* is an aberration diagram of distortion of Example 2.
Figure 8D:
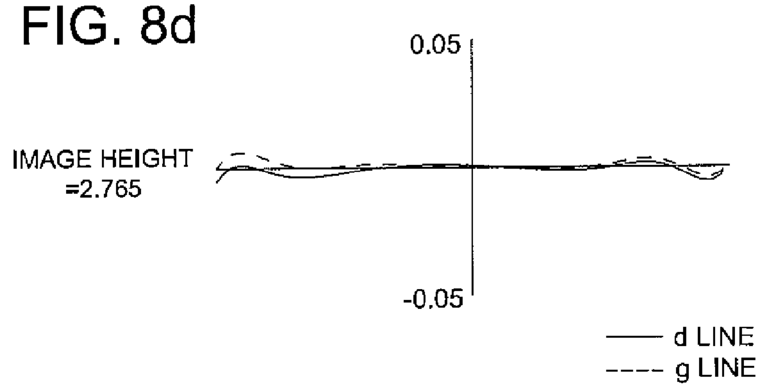
FIG. 8*d* and 8*e* are an aberration diagram of meridional comatic aberration of Example 2.
Figure 8E:
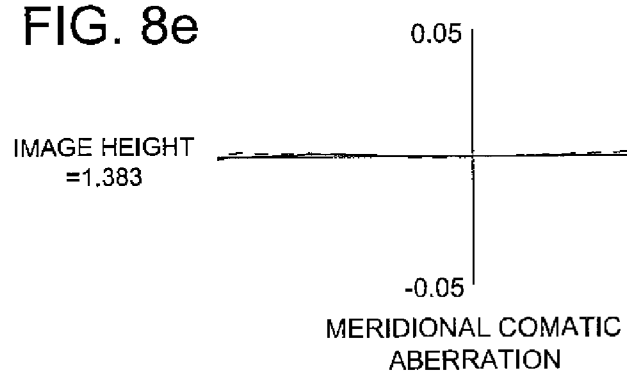

FIG. 7 is a cross sectional view of the lens of Example 2. In the drawing, L1 denotes the first lens, L2 denotes the second lens, L3 denotes the third lens, L4 denotes the fourth lens, L5 denotes the fifth lens, S denotes the aperture stop, and I denotes the imaging surface. Further, F denotes a parallel plate supposed to be an optical low pass filter, an IR cut filter, a cover glass of a solid state image sensor, or the like. FIGS. 8*a*-8*e* are aberration diagrams, and FIG. 8*a* shows the spherical aberration coefficient, FIG. 8*b* shows the astigmatism, FIG. 8*c* shows the distortion, and FIGS. 8*d*-8*e* show the meridional comatic aberrations of Example 2. In this example, all the lenses are made of plastic materials, the image-side surface of the fifth lens L5 has an aspherical shape and has a curvature changing point at a position other than the intersection point between the image-side surface and the optical axis; the first lens L1, the second lens L2, and the fifth lens L5 are fixed with respect to the imaging surface I; and the third lens L3 and the fourth lens L4 are integrally moved in the optical axis direction to focus.

Example 3

The lens data of an imaging lens of Example 3 are as follows.

f = 3.68 mm, fB = 0.24 mm, F = 2.45, 2Y = 5.53 mm
ENTP = 0.37 mm, EXTP = −2.43 mm,
H1 = −1.01 mm, H2 = −3.44 mm

| Surface No. | R (mm) | D (mm) | Nd | νd | Effective Radius (mm) |
|---|---|---|---|---|---|
| 1* | 1.565 | 0.42 | 1.54470 | 56.2 | 0.87 |
| 2* | 67.133 | 0.05 | | | 0.75 |
| 3 (aperture) | ∞ | 0.00 | | | 0.69 |
| 4* | 2.812 | 0.23 | 1.63200 | 23.4 | 0.71 |
| 5* | 1.443 | 0.70 | | | 0.75 |

-continued

| | | | | | |
|---|---|---|---|---|---|
| 6* | 4.918 | 0.41 | 1.63200 | 23.4 | 1.19 |
| 7* | 3.239 | 0.15 | | | 1.53 |
| 8* | 48.912 | 0.91 | 1.54470 | 56.2 | 1.78 |
| 9* | −1.633 | 0.45 | | | 1.79 |
| 10* | 3.065 | 0.47 | 1.53050 | 55.7 | 2.09 |
| 11* | 1.070 | 0.50 | | | 2.48 |
| 12 | ∞ | 0.15 | 1.51630 | 64.1 | 2.77 |
| 13 | ∞ | 2.81 | | | |

Aspherical Coefficient:

1st Surface

K = 0.33365E+00
A3 = 0.10687E−02
A4 = −0.10276E−02
A5 = −0.38013E−03
A6 = 0.23951E−01
A7 = 0.25771E−02
A8 = −0.35839E−01
A9 = 0.35017E−02
A10 = 0.44681E−01
A11 = 0.96501E−03
A12 = −0.69520E−03
A13 = −0.20433E−02
A14 = −0.26936E−02
A15 = −0.23462E−02
A16 = −0.79845E−03
A17 = 0.20702E−02
A18 = 0.63322E−02
A19 = 0.11943E−01
A20 = 0.18806E−01

2nd Surface

K = −0.28795E+03
A3 = −0.12360E−03
A4 = 0.79803E−01
A5 = 0.15462E−02
A6 = −0.60149E−01
A7 = 0.41253E−02
A8 = 0.37670E−01
A9 = 0.42893E−02
A10 = 0.91269E−02
A11 = 0.19387E−02
A12 = 0.20187E−03
A13 = −0.15916E−02
A14 = −0.30599E−02
A15 = −0.35316E−02
A16 = −0.21966E−02
A17 = 0.19911E−02
A18 = 0.10630E−01
A19 = 0.25872E−01
A20 = 0.50044E−01

4th Surface

K = −0.53817E+01
A3 = −0.13510E−02
A4 = 0.10359E−01
A5 = 0.43673E−04
A6 = 0.99516E−02
A7 = −0.77823E−03
A8 = −0.37665E−01
A9 = −0.22359E−04
A10 = −0.21482E−01
A11 = 0.25974E−02
A12 = 0.35278E−01
A13 = 0.62698E−02
A14 = 0.72484E−02
A15 = 0.76169E−02
A16 = 0.47174E−02
A17 = 0.62851E−03
A18 = −0.96395E−02
A19 = −0.26668E−01
A20 = −0.60934E−01

5th Surface

K = −0.33470E+01
A3 = 0.67859E−03
A4 = 0.51997E−01

-continued

A5 = −0.20795E−02
A6 = 0.79159E−01
A7 = 0.52254E−04
A8 = −0.74636E−01
A9 = 0.30632E−02
A10 = 0.23945E−02
A11 = 0.74643E−03
A12 = 0.57505E−01
A13 = −0.42666E−02
A14 = −0.97024E−02
A15 = −0.14297E−01
A16 = −0.13906E−01
A17 = −0.67687E−02
A18 = 0.13520E−01
A19 = 0.29731E−01
A20 = 0.70283E−01

6th Surface

K = −0.14869E+02
A3 = −0.58580E−03
A4 = −0.72731E−01
A5 = 0.65013E−03
A6 = 0.90955E−02
A7 = −0.52104E−03
A8 = −0.40835E−02
A9 = −0.63465E−03
A10 = −0.30644E−02
A11 = 0.30895E−04
A12 = −0.95871E−03
A13 = 0.31204E−03
A14 = 0.24355E−03
A15 = 0.11094E−03
A16 = −0.20707E−04
A17 = −0.97436E−04
A18 = −0.14753E−03
A19 = −0.14625E−03
A20 = −0.12087E−03

7th Surface

K = −0.18396E+02
A3 = −0.16252E−02
A4 = −0.27832E−01
A5 = −0.27924E−03
A6 = −0.51325E−02
A7 = 0.15128E−04
A8 = 0.18582E−02
A9 = −0.22568E−06
A10 = −0.10271E−02
A11 = −0.47691E−04
A12 = −0.49470E−04
A13 = −0.13555E−04
A14 = 0.39860E−06
A15 = 0.47743E−05
A16 = 0.44291E−05
A17 = 0.22845E−05
A18 = 0.16143E−06
A19 = −0.99954E−06
A20 = −0.17961E−05

8th Surface

K = −0.29454E+04
A3 = 0.11016E−02
A4 = −0.33024E−01
A5 = −0.37697E−03
A6 = 0.84214E−02
A7 = 0.10270E−04
A8 = 0.32206E−02
A9 = 0.11801E−04
A10 = −0.68171E−03
A11 = 0.26906E−05
A12 = 0.37020E−04
A13 = 0.32689E−06
A14 = 0.58732E−07
A15 = 0.92411E−07
A16 = 0.58474E−08
A17 = 0.39584E−07
A18 = 0.45750E−07
A19 = 0.74080E−08
A20 = 0.12751E−07

-continued

| 9th Surface |
|---|
| K = −0.33289E+01 |
| A3 = −0.13228E−02 |
| A4 = −0.86919E−01 |
| A5 = 0.31349E−03 |
| A6 = 0.49903E−01 |
| A7 = −0.11306E−03 |
| A8 = −0.32976E−01 |
| A9 = −0.32082E−04 |
| A10 = 0.17411E−01 |
| A11 = −0.26811E−05 |
| A12 = −0.32650E−02 |
| A13 = 0.14081E−07 |
| A14 = −0.24323E−04 |
| A15 = 0.14003E−06 |
| A16 = 0.47259E−04 |
| A17 = 0.10316E−06 |
| A18 = 0.86546E−07 |
| A19 = 0.65156E−07 |
| A20 = 0.45145E−07 |

| 10th Surface |
|---|
| K = −0.65933E+02 |
| A3 = 0.40809E−03 |
| A4 = −0.19492E+00 |
| A5 = 0.29677E−03 |
| A6 = 0.73093E−01 |
| A7 = 0.22332E−04 |
| A8 = −0.92865E−02 |
| A9 = 0.19284E−05 |
| A10 = −0.63802E−03 |
| A11 = 0.24692E−05 |
| A12 = 0.87377E−04 |
| A13 = 0.89348E−06 |
| A14 = 0.19425E−04 |
| A15 = 0.16003E−06 |
| A16 = 0.35179E−07 |
| A17 = −0.36636E−08 |
| A18 = −0.18275E−07 |
| A19 = −0.18669E−07 |
| A20 = −0.14195E−07 |

| 11th Surface |
|---|
| K = −0.56898E+01 |
| A3 = 0.52233E−03 |
| A4 = −0.81361E−01 |
| A5 = 0.22989E−03 |
| A6 = 0.28087E−01 |
| A7 = −0.23799E−04 |
| A8 = −0.76161E−02 |
| A9 = 0.45168E−05 |
| A10 = 0.12550E−02 |
| A11 = 0.47259E−06 |
| A12 = −0.13787E−03 |
| A13 = −0.36673E−07 |
| A14 = 0.76417E−05 |
| A15 = −0.88393E−08 |
| A16 = −0.43197E−08 |
| A17 = −0.33547E−09 |
| A18 = 0.56697E−11 |
| A19 = 0.15960E−09 |
| A20 = 0.25396E−09 |

Data of Each Single Lens:

| Lens | Front Surface | Focal Length (mm) |
|---|---|---|
| 1 | 1 | 2.936 |
| 2 | 4 | −5.023 |
| 3 | 6 | −16.605 |
| 4 | 8 | 2.920 |
| 5 | 10 | −3.379 |

Figure 9:
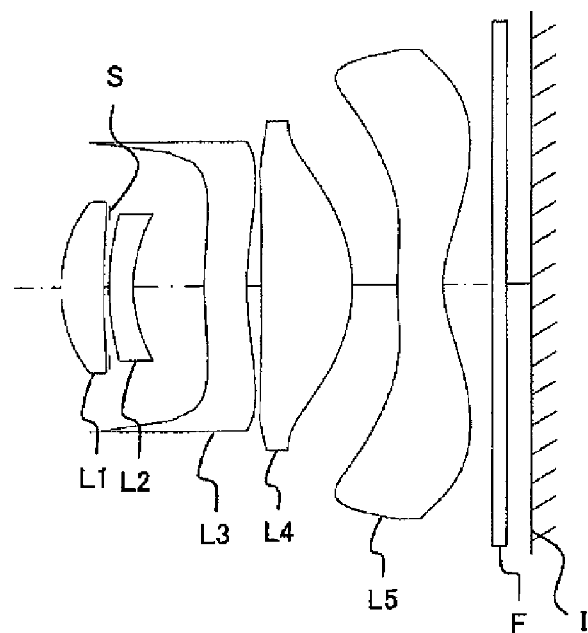
FIG. 9 is a cross section of an imaging lens of Example 3 in an optical axis direction.
Figure 10A:
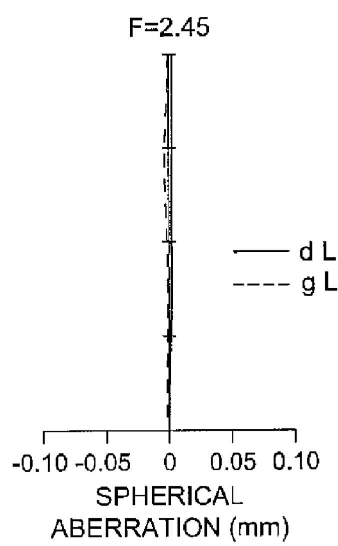
FIG. 10*a* is an aberration diagram of spherical aberration coefficient of Example 3.
Figure 10B:
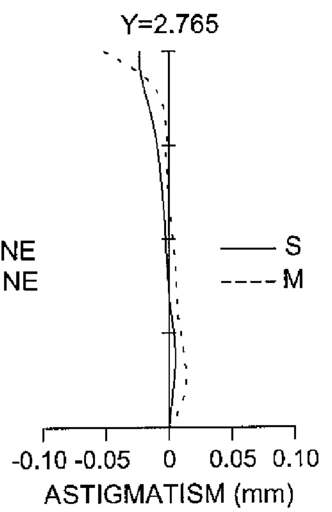
FIG. 10*b* is an aberration diagram of astigmatism of Example 3.
Figure 10C:
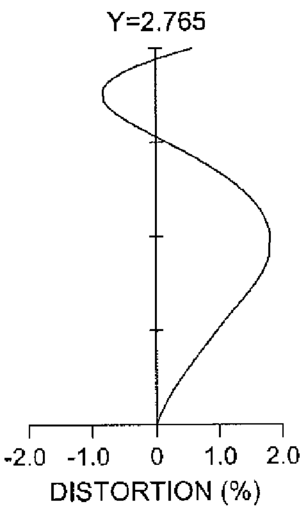
FIG. 10*c* is an aberration diagram of distortion of Example 3.
Figure 10D:
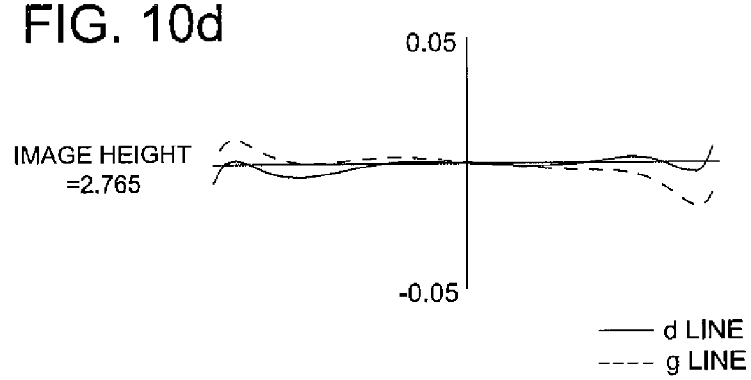
FIG. 10*d* and 10*e* are an aberration diagram of meridional comatic aberration of Example 3.
Figure 10E:
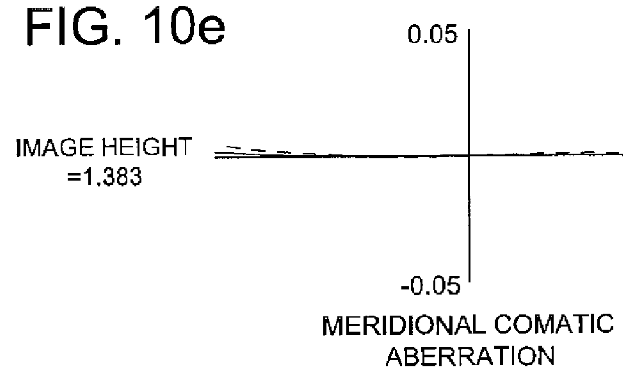

FIG. 9 is a cross sectional view of the lens of Example 3. In the drawing, L1 denotes the first lens, L2 denotes the second lens, L3 denotes the third lens, L4 denotes the fourth lens, L5 denotes the fifth lens, S denotes the aperture stop, and I denotes the imaging surface. Further, F denotes a parallel plate supposed to be an optical low pass filter, an IR cut filter, a cover glass of a solid state image sensor, or the like. FIGS. 10*a*-10*d* are aberration diagrams, and FIG. 10*a* shows the spherical aberration coefficient, FIG. 10*b* shows the astigmatism, FIG. 10*c* shows the distortion, and FIGS. 10*d*-10*e* show the meridional comatic aberrations of Example 3. In this example, all the lenses are made of plastic materials, the image-side surface of the fifth lens L5 has an aspherical shape and has a curvature changing point at a position other than the intersection point between the image-side surface and the optical axis; the first lens L1, the second lens L2, and the fifth lens L5 are fixed with respect to the imaging surface I; and the third lens L3 and the fourth lens L4 are integrally moved in the optical axis direction to focus.

Example 4

The lens data of an imaging lens of Example 4 are as follows.

f = 3.63 mm, fB = 0.13 mm, F = 2.4, 2Y = 5.53 mm
ENTP = 0.41 mm, EXTP = −2.82 mm,
H1 = −0.43 mm, H2 = −3.5 mm

| Surface No. | R (mm) | D (mm) | Nd | νd | Effective Radius (mm) |
|---|---|---|---|---|---|
| 1* | 2.320 | 0.53 | 1.54470 | 56.2 | 0.99 |
| 2* | −7.843 | 0.03 | | | 0.84 |
| 3 (aperture) | ∞ | 0.04 | | | 0.71 |
| 4* | 3.252 | 0.30 | 1.63200 | 23.4 | 0.74 |
| 5* | 1.583 | 0.66 | | | 0.81 |
| 6* | 3.025 | 0.30 | 1.63200 | 23.4 | 1.25 |
| 7* | 2.080 | 0.12 | | | 1.53 |
| 8* | 5.788 | 1.39 | 1.54470 | 56.2 | 1.85 |
| 9* | −1.647 | 0.33 | | | 1.93 |
| 10* | 1.946 | 0.49 | 1.54470 | 56.2 | 2.22 |
| 11* | 0.869 | 0.70 | | | 2.64 |
| 12 | ∞ | 0.15 | 1.51630 | 64.1 | 2.82 |
| 13 | ∞ | | | | 2.86 |

Aspherical Coefficient:

| 1st Surface |
|---|
| K = −0.22138E+00 |
| A3 = −0.88351E−03 |
| A4 = −0.10849E−01 |
| A5 = 0.14624E−02 |
| A6 = −0.14871E−01 |
| A7 = −0.41092E−03 |
| A8 = 0.48040E−02 |
| A9 = −0.64370E−03 |
| A10 = −0.19742E−01 |
| A11 = 0.12559E−03 |
| A12 = 0.60011E−03 |
| A13 = 0.98700E−03 |
| A14 = 0.11988E−02 |
| A15 = 0.11831E−02 |
| A16 = 0.90388E−03 |
| A17 = 0.33871E−03 |
| A18 = −0.22374E−03 |
| A19 = −0.13311E−02 |
| A20 = −0.27597E−02 |

| 2nd Surface |
|---|
| K = 0.22795E+02 |
| A3 = 0.45994E−04 |
| A4 = 0.30168E−01 |
| A5 = −0.80161E−04 |
| A6 = 0.17934E−02 |
| A7 = 0.12282E−02 |
| A8 = −0.96301E−01 |
| A9 = 0.16603E−02 |
| A10 = 0.57783E−01 |
| A11 = 0.16529E−02 |
| A12 = 0.92740E−03 |
| A13 = −0.10158E−03 |

A14 = −0.14652E−02
A15 = −0.32314E−02
A16 = −0.50850E−02
A17 = −0.65290E−02
A18 = −0.56432E−02
A19 = −0.15566E−02
A20 = 0.62102E−02

4th Surface

K = −0.14011E+02
A3 = −0.36399E−02
A4 = 0.10521E−01
A5 = −0.25313E−02
A6 = 0.10730E+00
A7 = −0.16455E−02
A8 = −0.23026E+00
A9 = 0.28841E−02
A10 = 0.15760E+00
A11 = 0.52014E−02
A12 = −0.11583E−01
A13 = 0.25475E−02
A14 = −0.74236E−03
A15 = −0.47662E−02
A16 = −0.88055E−02
A17 = −0.11590E−01
A18 = −0.10920E−01
A19 = −0.34846E−02
A20 = 0.15057E−01

5th Surface

K = −0.44390E+01
A3 = −0.17662E−02
A4 = 0.24441E−01
A5 = −0.10978E−02
A6 = 0.79540E−01
A7 = −0.14890E−02
A8 = −0.82277E−01
A9 = 0.15812E−02
A10 = −0.29836E−01
A11 = 0.34186E−02
A12 = 0.63641E−01
A13 = 0.67654E−03
A14 = −0.24643E−02
A15 = −0.59742E−02
A16 = −0.87544E−02
A17 = −0.89122E−02
A18 = −0.47722E−02
A19 = 0.81122E−02
A20 = 0.32854E−01

6th Surface

K = −0.25309E+02
A3 = −0.27600E−02
A4 = −0.50027E−01
A5 = 0.40529E−03
A6 = −0.15959E−01
A7 = 0.65393E−04
A8 = 0.36509E−02
A9 = −0.27129E−03
A10 = 0.66114E−02
A11 = −0.84400E−04
A12 = −0.52711E−02
A13 = 0.62713E−04
A14 = 0.67589E−04
A15 = 0.49187E−04
A16 = 0.23528E−04
A17 = 0.35196E−05
A18 = −0.80046E−05
A19 = −0.88937E−05
A20 = −0.23669E−05

7th Surface

K = −0.12888E+02
A3 = 0.35829E−03
A4 = −0.31911E−01
A5 = −0.25577E−03
A6 = −0.11048E−01
A7 = 0.46714E−04
A8 = 0.52643E−02

A9 = 0.60807E−04
A10 = −0.48379E−03
A11 = −0.85321E−05
A12 = −0.47485E−03
A13 = −0.50193E−05
A14 = 0.10985E−05
A15 = 0.37818E−05
A16 = 0.41821E−05
A17 = 0.29767E−05
A18 = 0.13539E−05
A19 = −0.79265E−07
A20 = −0.10930E−05

8th Surface

K = −0.27859E+02
A3 = −0.72094E−03
A4 = −0.17807E−01
A5 = 0.13927E−03
A6 = 0.78236E−02
A7 = 0.15930E−03
A8 = 0.17687E−02
A9 = 0.28790E−04
A10 = −0.81274E−03
A11 = −0.20335E−05
A12 = 0.55026E−04
A13 = −0.21807E−05
A14 = −0.11154E−05
A15 = −0.39576E−06
A16 = −0.23177E−07
A17 = 0.73803E−07
A18 = 0.80081E−07
A19 = 0.52432E−07
A20 = 0.26497E−07

9th Surface

K = −0.14772E+01
A3 = −0.26748E−02
A4 = −0.38633E−01
A5 = 0.26239E−03
A6 = 0.44326E−01
A7 = 0.20371E−04
A8 = −0.37178E−01
A9 = 0.22525E−04
A10 = 0.17661E−01
A11 = 0.75572E−05
A12 = −0.30949E−02
A13 = 0.98269E−06
A14 = 0.10378E−04
A15 = −0.17678E−06
A16 = −0.31387E−04
A17 = −0.69780E−07
A18 = −0.25511E−07
A19 = 0.14334E−08
A20 = 0.11049E−07

10th Surface

K = −0.17853E+02
A3 = −0.56622E−02
A4 = −0.18458E+00
A5 = 0.99443E−03
A6 = 0.60900E−01
A7 = 0.19682E−04
A8 = −0.74261E−02
A9 = −0.18022E−04
A10 = 0.38630E−03
A11 = −0.20844E−05
A12 = −0.10005E−03
A13 = 0.80533E−06
A14 = 0.15281E−04
A15 = 0.19233E−06
A16 = 0.71169E−07
A17 = 0.16057E−07
A18 = −0.91132E−08
A19 = −0.87933E−08
A20 = −0.64079E−08

11th Surface

K = −0.37528E+01
A3 = −0.93591E−02

-continued

| |
|---|
| A4 = −0.91891E−01 |
| A5 = 0.55940E−02 |
| A6 = 0.34040E−01 |
| A7 = −0.49685E−03 |
| A8 = −0.93912E−02 |
| A9 = 0.37605E−04 |
| A10 = 0.15533E−02 |
| A11 = 0.51139E−05 |
| A12 = −0.14004E−03 |
| A13 = 0.37474E−06 |
| A14 = 0.52567E−05 |
| A15 = −0.85652E−07 |
| A16 = −0.31453E−07 |
| A17 = −0.10484E−07 |
| A18 = −0.23880E−08 |
| A19 = 0.12900E−08 |
| A20 = 0.62972E−09 |

Data of Each Single Lens:

| Lens | Front Surface | Focal Length (mm) |
|---|---|---|
| 1 | 1 | 3.348 |
| 2 | 4 | −5.249 |
| 3 | 6 | −12.023 |
| 4 | 8 | 2.521 |
| 5 | 10 | −3.434 |

Figure 11:
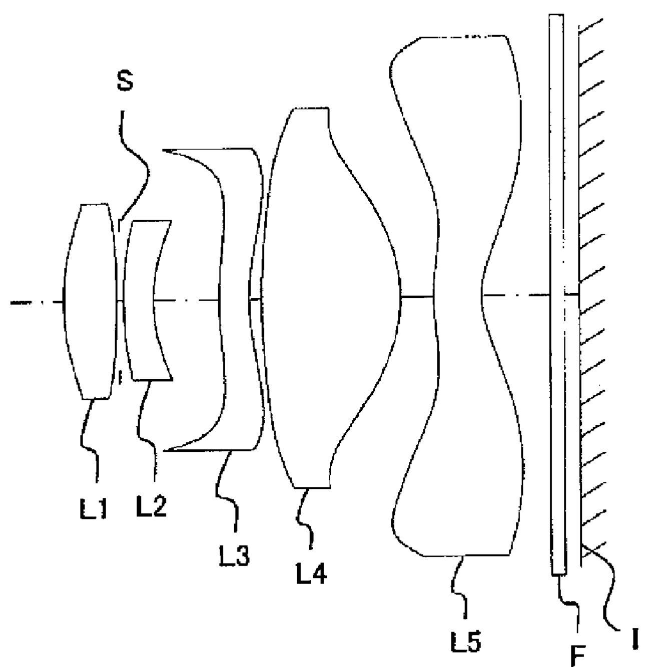
FIG. 11 is a cross section of an imaging lens of Example 4 in an optical axis direction.
Figure 12A:
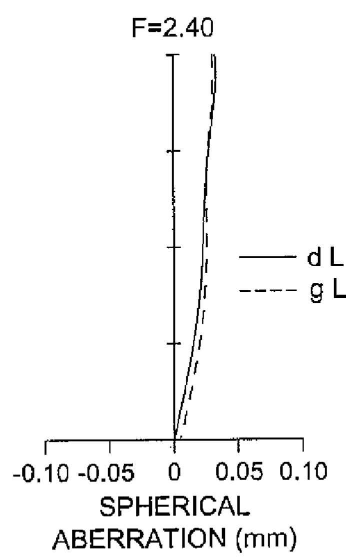
FIG. 12*a* is an aberration diagram of spherical aberration coefficient of Example 4.
Figure 12B:
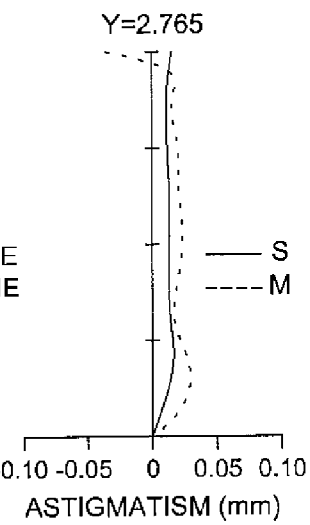
FIG. 12*b* is an aberration diagram of astigmatism of Example 4.
Figure 12C:
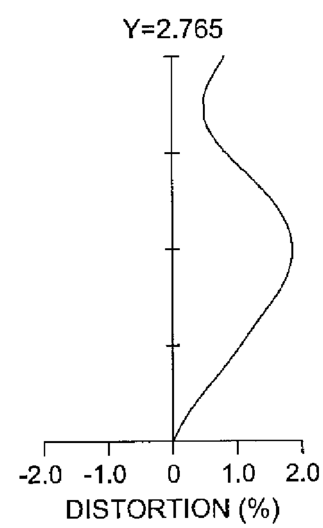
FIG. 12*c* is an aberration diagram of distortion of Example 4.
Figure 12D:
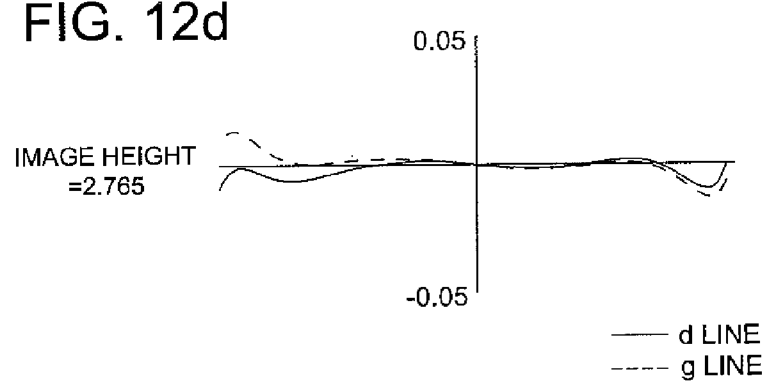
FIG. 12*d* and 12*e* are an aberration diagram of meridional somatic aberration of Example 4.
Figure 12E:
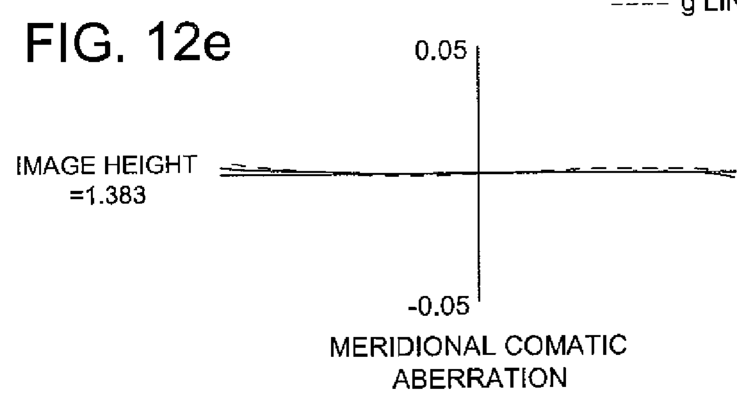

FIG. 11 is a cross sectional view of the lens of Example 4. In the drawing, L1 denotes the first lens, L2 denotes the second lens, L3 denotes the third lens, L4 denotes the fourth lens, L5 denotes the fifth lens, S denotes the aperture stop, and I denotes the imaging surface. Further, F denotes a parallel plate supposed to be an optical low pass filter, an IR cut filter, a cover glass of a solid state image sensor, or the like. FIGS. 12*a*-12*e* are aberration diagrams, and FIG. 12*a* shows the spherical aberration coefficient, FIG. 12*b* shows the astigmatism, FIG. 12*c* shows the distortion, and FIGS. 12*d*-12*e* show the meridional comatic aberrations of Example 4. In this example, all the lenses are made of plastic materials, the image-side surface of the fifth lens L5 has an aspherical shape and has a curvature changing point at a position other than the intersection point between the image-side surface and the optical axis; the first lens L1, the second lens L2, and the fifth lens L5 are fixed with respect to the imaging surface I; and the third lens L3 and the fourth lens L4 are integrally moved in the optical axis direction to focus.

Example 5

The lens data of an imaging lens of Example 5 are as follows.

f = 3.68 mm, fB = 0.21 mm, F = 2.45, 2Y = 5.53 mm
ENTP = 0.28 mm, EXTP = −2.52 mm,
H1 = −0.99 mm, H2 = −3.47 mm

| Surface No. | R (mm) | D (mm) | Nd | νd | Effective Radius (mm) |
|---|---|---|---|---|---|
| 1* | 1.735 | 0.35 | 1.54470 | 56.2 | 0.86 |
| 2* | −10.498 | 0.03 | | | 0.78 |
| 3 (aperture) | ∞ | 0.03 | | | 0.71 |
| 4* | 2.683 | 0.18 | 1.72820 | 28.5 | 0.73 |
| 5* | 1.362 | 0.77 | | | 0.76 |
| 6* | 3.171 | 0.18 | 1.63200 | 23.4 | 1.14 |
| 7* | 2.005 | 0.15 | | | 1.34 |
| 8* | 6.595 | 1.25 | 1.54470 | 56.2 | 1.65 |
| 9* | −1.555 | 0.70 | | | 1.74 |
| 10* | 3.660 | 0.42 | 1.54470 | 56.2 | 1.99 |
| 11* | 1.054 | 0.50 | | | 2.53 |
| 12 | ∞ | 0.15 | 1.51630 | 64.1 | 2.79 |
| 13 | ∞ | 2.83 | | | |

-continued

Aspherical Coefficient:

| 1st Surface |
|---|
| K = 0.49405E+00 |
| A3 = −0.11385E−03 |
| A4 = 0.91399E−02 |
| A5 = −0.27033E−04 |
| A6 = 0.12520E−02 |
| A7 = 0.12519E−03 |
| A8 = 0.61569E−02 |
| A9 = 0.22684E−03 |
| A10 = 0.17574E−01 |
| A11 = −0.51667E−04 |
| A12 = −0.27577E−03 |
| A13 = −0.47891E−03 |
| A14 = −0.58278E−03 |
| A15 = −0.49659E−03 |
| A16 = −0.89019E−04 |
| A17 = 0.70219E−03 |
| A18 = 0.20202E−02 |
| A19 = 0.39869E−02 |
| A20 = 0.67688E−02 |

| 2nd Surface |
|---|
| K = 0.52663E+01 |
| A3 = 0.12533E−03 |
| A4 = 0.89097E−01 |
| A5 = 0.94122E−04 |
| A6 = −0.55238E−01 |
| A7 = −0.15715E−04 |
| A8 = 0.41148E−01 |
| A9 = 0.92993E−04 |
| A10 = −0.16457E−01 |
| A11 = 0.55210E−03 |
| A12 = 0.10010E−02 |
| A13 = 0.12738E−02 |
| A14 = 0.14019E−02 |
| A15 = 0.22259E−02 |
| A16 = 0.18178E−02 |
| A17 = 0.24563E−02 |
| A18 = 0.45968E−03 |
| A19 = 0.60613E−03 |
| A20 = −0.53996E−02 |

| 4th Surface |
|---|
| K = −0.26717E+02 |
| A3 = −0.15783E−03 |
| A4 = 0.44097E−02 |
| A5 = 0.10562E−04 |
| A6 = 0.36667E−01 |
| A7 = 0.74230E−04 |
| A8 = −0.52838E−01 |
| A9 = 0.20183E−03 |
| A10 = −0.84983E−02 |
| A11 = 0.37284E−03 |
| A12 = 0.25149E−02 |
| A13 = 0.69162E−03 |
| A14 = 0.79456E−03 |
| A15 = 0.97176E−03 |
| A16 = 0.89797E−03 |
| A17 = 0.89408E−03 |
| A18 = 0.34099E−03 |
| A19 = −0.22564E−04 |
| A20 = −0.14704E−02 |

| 5th Surface |
|---|
| K = −0.63391E+01 |
| A3 = −0.98727E−04 |
| A4 = 0.43001E−01 |
| A5 = −0.26692E−04 |
| A6 = 0.75568E−01 |
| A7 = 0.90926E−06 |
| A8 = −0.76099E−01 |
| A9 = 0.21556E−03 |
| A10 = 0.51254E−02 |
| A11 = 0.39505E−03 |
| A12 = 0.33907E−01 |
| A13 = 0.34701E−03 |

-continued

A14 = 0.17310E−03
A15 = 0.62953E−04
A16 = −0.99728E−05
A17 = −0.59306E−03
A18 = −0.24200E−03
A19 = 0.55779E−03
A20 = 0.17061E−03

6th Surface

K = −0.49961E+02
A3 = −0.22492E−03
A4 = −0.13926E+00
A5 = 0.87450E−04
A6 = 0.35345E−03
A7 = 0.19388E−05
A8 = −0.35482E−02
A9 = −0.13407E−04
A10 = −0.96157E−02
A11 = −0.66974E−05
A12 = 0.10114E−01
A13 = 0.20408E−05
A14 = 0.40631E−05
A15 = 0.40930E−05
A16 = 0.23471E−05
A17 = −0.37023E−06
A18 = −0.39931E−05
A19 = −0.77668E−05
A20 = −0.11237E−04

7th Surface

K = −0.16914E+02
A3 = 0.15397E−03
A4 = −0.10161E+00
A5 = 0.21910E−05
A6 = 0.10356E−01
A7 = 0.48083E−05
A8 = −0.23631E−02
A9 = 0.71361E−06
A10 = −0.14414E−02
A11 = 0.28066E−05
A12 = 0.18899E−02
A13 = 0.21621E−05
A14 = 0.13977E−05
A15 = 0.63275E−06
A16 = 0.68198E−07
A17 = −0.37278E−06
A18 = −0.64063E−06
A19 = −0.79371E−06
A20 = −0.84281E−06

8th Surface

K = −0.20425E+02
A3 = −0.26596E−03
A4 = −0.33377E−01
A5 = 0.45309E−05
A6 = 0.89660E−02
A7 = 0.16643E−05
A8 = 0.21668E−02
A9 = 0.42965E−07
A10 = −0.13756E−02
A11 = −0.33423E−06
A12 = 0.19814E−03
A13 = −0.16097E−06
A14 = −0.93442E−07
A15 = −0.39490E−07
A16 = −0.11243E−07
A17 = −0.12437E−08
A18 = 0.30014E−08
A19 = 0.33782E−08
A20 = 0.27588E−08

9th Surface

K = −0.36270E+01
A3 = 0.75087E−04
A4 = −0.96647E−01
A5 = 0.56249E−05
A6 = 0.49122E−01
A7 = −0.30487E−05
A8 = −0.34155E−01

-continued

A9 = −0.83572E−06
A10 = 0.16776E−01
A11 = −0.61813E−07
A12 = −0.33088E−02
A13 = 0.53269E−07
A14 = −0.71380E−06
A15 = 0.30467E−07
A16 = 0.50296E−04
A17 = 0.10512E−07
A18 = 0.56527E−08
A19 = 0.29371E−08
A20 = 0.14855E−08

10th Surface

K = −0.91860E+02
A3 = 0.00000E+00
A4 = −0.22269E+00
A5 = 0.15935E−03
A6 = 0.78370E−01
A7 = 0.70339E−05
A8 = −0.95655E−02
A9 = 0.45873E−06
A10 = −0.62246E−03
A11 = 0.55196E−06
A12 = 0.11627E−03
A13 = 0.20033E−06
A14 = 0.94245E−05
A15 = 0.39324E−07
A16 = 0.12578E−07
A17 = 0.16231E−08
A18 = −0.15277E−08
A19 = −0.23665E−08
A20 = −0.20630E−08

11th Surface

K = −0.53718E+01
A3 = 0.49035E−03
A4 = −0.88408E−01
A5 = 0.11629E−04
A6 = 0.31962E−01
A7 = 0.47093E−06
A8 = −0.81714E−02
A9 = 0.75697E−06
A10 = 0.13257E−02
A11 = 0.78760E−07
A12 = −0.13656E−03
A13 = −0.12841E−08
A14 = 0.66443E−05
A15 = −0.13615E−08
A16 = −0.54188E−09
A17 = −0.17631E−09
A18 = −0.32450E−10
A19 = 0.77638E−11
A20 = 0.13487E−10

Data of Each Single Lens:

| Lens | Front Surface | Focal Length (mm) |
|---|---|---|
| 1 | 1 | 2.762 |
| 2 | 4 | −4.037 |
| 3 | 6 | −9.182 |
| 4 | 8 | 2.442 |
| 5 | 10 | −2.880 |

Figure 13:
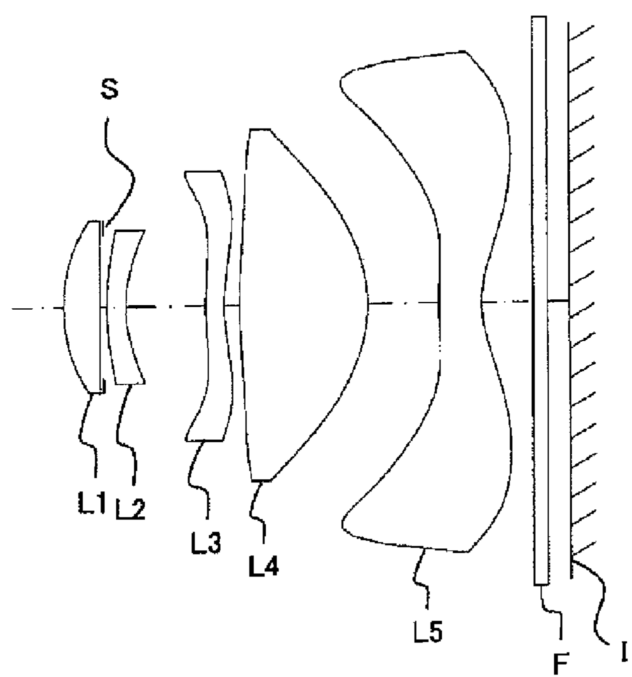
FIG. 13 is a cross section of an imaging lens of Example 5 in an optical axis direction.
Figure 14A:
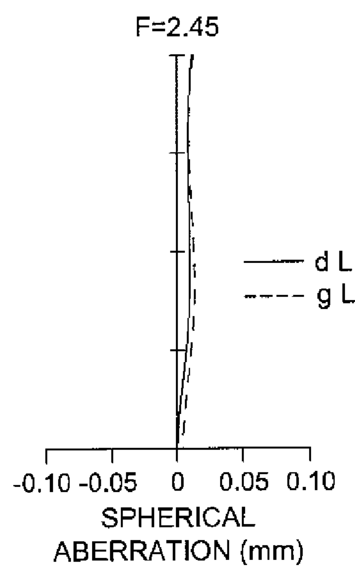
FIG. 14*a* is an aberration diagram of spherical aberration coefficient of Example 5.
Figure 14B:
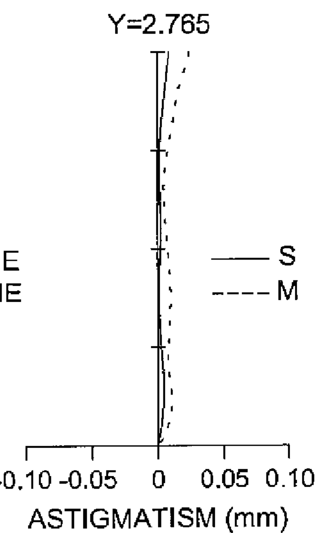
FIG. 14*b* is an aberration diagram of astigmatism of Example 5.
Figure 14C:
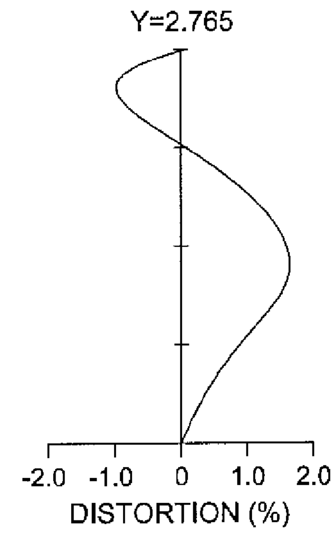
FIG. 14*c* is an aberration diagram of distortion of Example 5.
Figure 14D:
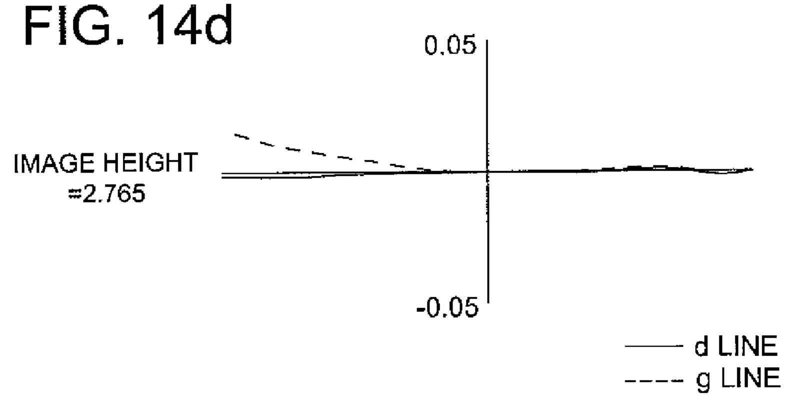
FIG. 14*d* and 14*e* are an aberration diagram of meridional comatic aberration of Example 5.
Figure 14E:
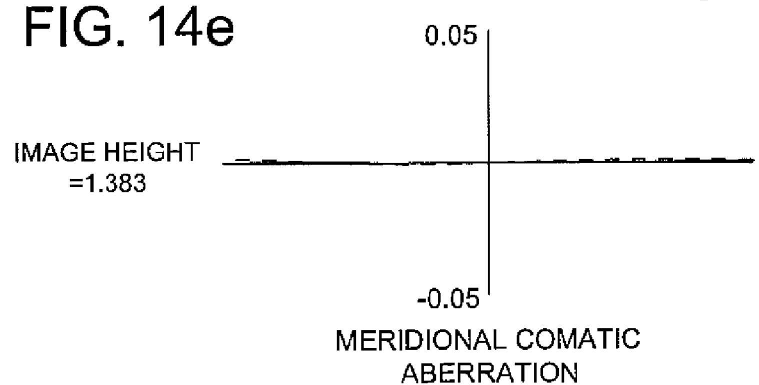

FIG. 13 is a cross sectional view of the lens of Example 5. In the drawing, L1 denotes the first lens, L2 denotes the second lens, L3 denotes the third lens, L4 denotes the fourth lens, L5 denotes the fifth lens, S denotes the aperture stop, and I denotes the imaging surface. Further, F denotes a parallel plate supposed to be an optical low pass filter, an IR cut filter, a cover glass of a solid state image sensor, or the like. FIGS. 14*a*-14*e* are aberration diagrams, and FIG. 14*a* shows the spherical aberration coefficient, FIG. 14*b* shows the astigmatism, FIG. 14*c* shows the distortion, and FIGS. 14*d*-14*e* show the meridional comatic aberrations of Example 5. In this example, all the lenses are made of plastic materials, the image-side surface of the fifth lens L5 has an aspherical shape and has a curvature changing point at a position other than the intersection point between the image-side surface and the optical axis; the first lens L1, the second lens L2, and the fifth lens L5 are fixed with respect to the imaging surface I; and the third lens L3 and the fourth lens L4 are integrally moved in the optical axis direction to focus.

Example 6

The lens data of an imaging lens of Example 6 are as follows.

f = 3.91 mm, fB = 0.1 mm, F = 2.3, 2Y = 5.83 mm
ENTP = 0.46 mm, EXTP = −2.6 mm,
H1 = −1.29 mm, H2 = −3.81 mm

| Surface No. | R(mm) | D(mm) | Nd | νd | Effective Radius (mm) |
|---|---|---|---|---|---|
| 1* | 1.677 | 0.51 | 1.54470 | 56.2 | 0.98 |
| 2* | 23.575 | 0.07 | | | 0.83 |
| 3 (aperture) | ∞ | 0.00 | | | 0.77 |
| 4* | 1.877 | 0.1 | 1.63200 | 23.4 | 0.79 |
| 5* | 1.236 | 0.80 | | | 0.82 |
| 6* | 31.525 | 0.26 | 1.63200 | 23.4 | 1.12 |
| 7* | 4.618 | 0.15 | | | 1.35 |
| 8* | −14.053 | 0.66 | 1.77250 | 49.6 | 1.56 |
| 9* | −2.169 | 1.30 | | | 1.62 |
| 10* | 2.699 | 0.39 | 1.54470 | 56.2 | 2.14 |
| 11* | 1.208 | 0.50 | | | 2.57 |
| 12 | ∞ | 0.15 | 1.51630 | 64.1 | 2.84 |
| 13 | ∞ | | | | 2.87 |

Aspherical Coefficient:

1st Surface

K = 0.13752E+01
A4 = −0.17889E−01
A6 = −0.15015E−01
A8 = 0.67335E−02
A10 = −0.11688E−01

2nd Surface

K = −0.50000E+02
A4 = 0.54575E−01
A6 = 0.11811E−01
A8 = −0.42240E−01
A10 = 0.49923E−01

4th Surface

K = −0.15073E+02
A4 = −0.84037E−02
A6 = 0.54088E−01
A8 = −0.74450E−01
A10 = −0.26884E−01
A12 = 0.33683E−01

5th Surface

K = −0.58347E+01
A4 = 0.29425E−01
A6 = 0.10431E+00
A8 = −0.11814E+00
A10 = 0.56857E−02
A12 = 0.46326E−01

6th Surface

K = −0.15382E+02
A4 = −0.16205E+00
A6 = 0.47001E−01
A8 = −0.31089E−01
A10 = −0.34682E−03
A12 = 0.82125E−02

7th Surface

K = −0.49711E+02
A4 = −0.10081E+00
A6 = 0.23190E−01
A8 = −0.78746E−02

-continued

A10 = −0.16069E−02
A12 = 0.19213E−02

8th Surface

K = 0.43453E+02
A4 = −0.34816E−01
A6 = 0.13118E−01
A8 = 0.52479E−02
A10 = −0.12206E−02
A12 = −0.56570E−04
A14 = −0.33612E−05
A16 = −0.82505E−06
A18 = 0.15746E−06
A20 = 0.16404E−06
A22 = 0.60583E−07
A24 = 0.15322E−07
A26 = 0.16557E−08
A28 = −0.12900E−08
A30 = −0.61010E−09
A32 = −0.21250E−09
A34 = −0.98958E−10
A36 = 0.47061E−10
A38 = 0.56875E−11
A40 = 3.08E−14

9th Surface

K = −0.70732E+01
A4 = −0.10283E+00
A6 = 0.54947E−01
A8 = −0.31765E−01
A10 = 0.17008E−01
A12 = −0.33673E−02
A14 = −0.23836E−04
A16 = 0.46714E−04

10th Surface

K = −0.26867E+02
A4 = −0.18157E+00
A6 = 0.64804E−01
A8 = −0.98283E−02
A10 = −0.12382E−04
A12 = 0.16080E−03
A14 = −0.11765E−04

11th Surface

K = −0.60753E+01
A4 = −0.86272E−01
A6 = 0.30916E−01
A8 = −0.77747E−02
A10 = 0.12637E−02
A12 = −0.12582E−03
A14 = 0.56450E−05

Data of Each Single Lens:

| Lens | Front Surface | Focal Length (mm) |
|---|---|---|
| 1 | 1 | 3.288 |
| 2 | 4 | −6.100 |
| 3 | 6 | −8.595 |
| 4 | 8 | 3.241 |
| 5 | 10 | −4.428 |

Figure 15:
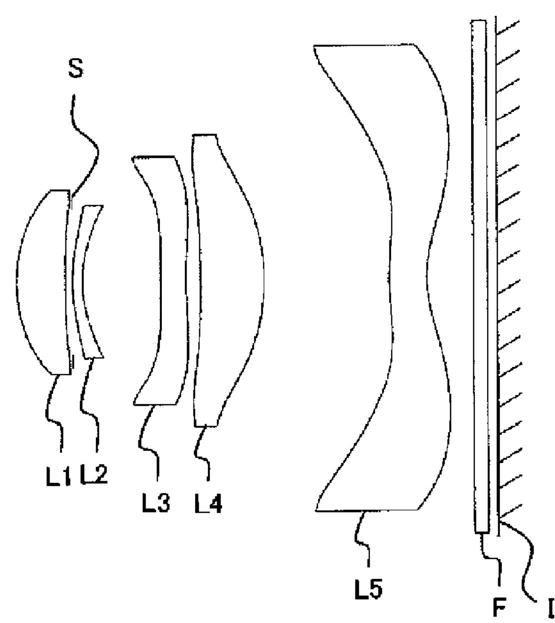
FIG. 15 is a cross section of an imaging lens of Example 6 in an optical axis direction.
Figure 16A:
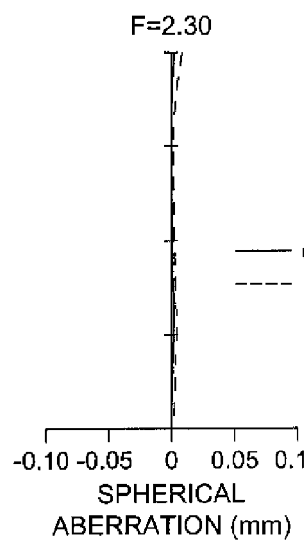
FIG. 16*a* is an aberration diagram of spherical aberration coefficient of Example 6.
Figure 16B:
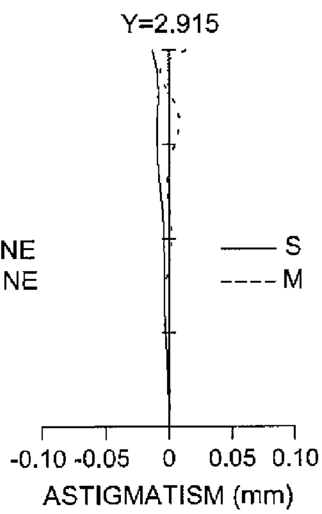
FIG. 16*b* is an aberration diagram of astigmatism of Example 6.
Figure 16C:
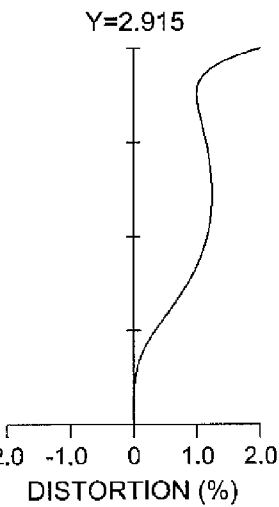
FIG. 16*c* is an aberration diagram of distortion of Example 6.
Figure 16D:
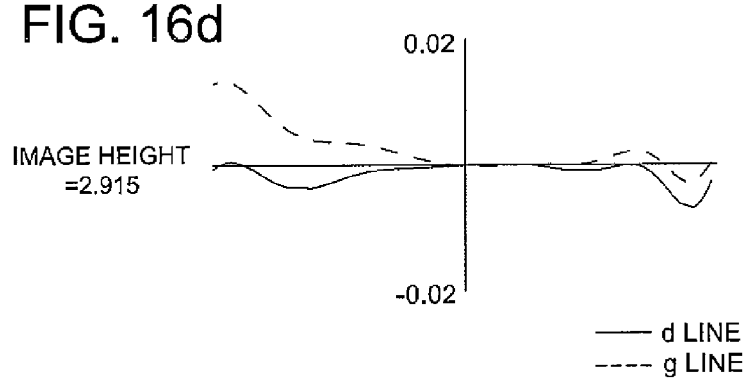
FIG. 16*d* and 16*e* are an aberration diagram of meridional comatic aberration of Example 6.
Figure 16E:
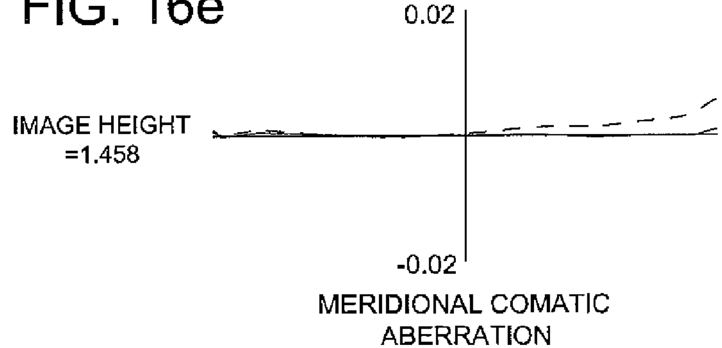

FIG. 15 is a cross sectional view of the lens of Example 6. In the thawing, L1 denotes the first lens, L2 denotes the second lens, L3 denotes the third lens, L4 denotes the fourth lens, L5 denotes the fifth lens, S denotes the aperture stop, and I denotes the imaging surface. Further, F denotes a parallel plate supposed to be an optical low pass filter, an IR cut filter, a cover glass of a solid state image sensor, or the like. FIGS. 16*a*-16*e* are aberration diagrams, and FIG. 16*a* shows the spherical aberration coefficient, FIG. 16*b* shows the astigmatism, FIG. 16*c* shows the distortion, and FIGS. 16*d*-16*e* show the meridional comatic aberrations of Example 6. In this example, all the lenses are made of plastic materials, the image-side surface of the fifth lens L5 has an aspherical shape and has a curvature changing point at a position other than the intersection point between the image-side surface and the optical axis; the first lens L1, the second lens L2, and the fifth lens L5 are fixed with respect to the imaging surface I; and the third lens L3 and the fourth lens L4 are integrally moved in the optical axis direction to focus.

Table 1 shows the values of the conditional expressions for the examples.

TABLE 1

| Conditional Expression | Example 1 | Example 2 | Example 3 | Example 4 | Example 5 | Example 6 |
|---|---|---|---|---|---|---|
| (1) f34/f | 1.00 | 0.89 | 0.95 | 0.84 | 0.83 | 1.21 |
| (2) f12/f | 1.45 | 1.54 | 1.47 | 1.84 | 1.72 | 1.50 |
| (3) ΣL12/f | 0.18 | 0.16 | 0.19 | 0.25 | 0.16 | 0.17 |
| (4) \|P3\|/P | 0.32 | 0.23 | 0.22 | 0.30 | 0.40 | 0.46 |
| (5) d25/f | 0.72 | 0.76 | 0.72 | 0.77 | 0.83 | 0.81 |
| (6) ν2 | 23.4 | 23.4 | 23.4 | 23.4 | 28.5 | 23.4 |
| (7) n2 | 1.632 | 1.632 | 1.632 | 1.632 | 1.728 | 1.632 |
| (8) L/2Y | 0.84 | 0.84 | 0.84 | 0.93 | 0.88 | 0.85 |

Plastic materials change their refractive indexes largely depending on the temperature; thus, if all of the lenses from the first lens to the fifth lens are made of plastic, there arises a problem that the image point position of the entire imaging lens varies when the ambient temperature changes.

Recently, it has been understood that inorganic fine particles mixed in plastic material reduce the change in the plastic material with respect to temperature. In detail, the plastic material with fine particles dispersed therein has a lower transmittance due to scattering of light in general, and it is difficult to use that material as optical material. However, when the sizes of the fine particles are smaller than the wavelength of the transmitting light, the scattering does not practically occur. While the refractive index of plastic material decreases with the increase in temperature, the refractive index of inorganic particles increases with the increase in temperature. Thus, by making these temperature dependences cancel each other, the refractive index can be made to change little. In particular, the plastic material as base material dispersed with inorganic particles having the maximum length of 20 nm or less has extremely low temperature dependence of refractive index. For example, acryl dispersed with niobium oxide ($Nb_2O_5$) fine particles has small change in refractive index due to change in temperature. In the present invention, when such plastic materials dispersed with inorganic particles are used for the positive lens (L1), which has a relatively large refractive power, or all the lenses (L1-L5), the variation of the image point position of the entire imaging lens caused by the change in temperature can be made small.

In addition, as a method for manufacturing image pickup apparatuses in high volume at low cost, in recent years there has been proposed a technique in which a reflow (heating process) process is performed with IC chips, other electronic components, and an optical element being placed on a substrate previously applied with solder so as to melt the solder and simultaneously assemble the electrical components and the optical element on the substrate.

When such reflow process is used to assemble components, the optical elements need to be heated up to about 200 to 260 degrees together with the electronic components; however, at such high temperatures there is a problem that the lenses made of thermoplastic resin can thermally deform or become discolored and the optical properties are degraded. As one of the measures to solve this problem, a technique is proposed in which glass mold lenses having high heat tolerance are used so as to realize downsizing and secure optical performance under a high temperature environment. However, there is a problem that they are higher in cost than the lenses made of thermoplastic resin and thus do not meat the demand for lower cost of an image pickup apparatus.

In order to solve this problem, an imaging lens is made of energy-setting resin to make the deterioration of the optical performance at a high temperature smaller than that of the lens made of thermoplastic resin including polycarbonate or polyolefin; thus the lens is effective in a reflow process and is easier to produce and lower in cost than a glass mold lens, whereby the low cost and high productivity of an image pickup apparatus equipped with an imaging lens are both secured. The energy-setting resin represents both of thermosetting resin and ultraviolet-curing resin. The plastic lens of the present invention may be made of the energy-setting resin.

It should be noted that in the examples the incident angle of the principle light of the light beam entering the imaging surface of the solid state image sensor is not designed to be small enough in the peripheral area of the imaging surface. However, by using recent technology, a color filter of a solid state image sensor and an on-chip micro-lens array have been improved so that the shading can be reduced. In particular, by setting the array pitch of the color filter or the on-chip micro-lens array smaller than the pixel pitch of the imaging surface of the imaging element, the color filter or the on-chip micro-lens array is shifted more toward the optical axis side of the imaging lens at a position closer to the peripheral of the imaging surface, so that the oblique incident light can be effectively led to the light receiving sections of the pixels. This arrangement can made the shading created on the solid state image sensor small. The examples are designed to seek to downsize more by the extent of relaxation of the above-mentioned requirement.

INDUSTRIAL APPLICABILITY

The present invention provides an imaging lens preferably used for a small-sized portable terminal.

DESCRIPTION OF THE NUMERALS

10: Imaging lens
50: Image pickup apparatus
51: Imaging element
51*a*: Photoelectric conversion section
52: Substrate
52*a*: Supporting plate
52*b*: Flexible substrate
53: Chassis
53*a*: Flange
54: External connection terminal
60: Input section
70: Display
80: Wireless communication section
91: Storage section
92: Temporary storage section
100: Mobile telephone
101: Controller
I: Imaging surface
F: Parallel plate
L1: First lens
L2: Second lens
L3: Third lens
L4: Fourth lens
L5: Fifth lens
S: Aperture stop

The invention claimed is:

1. An imaging lens for forming a subject image on an imaging surface of a photoelectric conversion section of a solid state image sensor, the imaging lens comprising in order from an object side:

a first lens having positive refractive power and a convex surface toward the object side;

a second lens having negative refractive power and a concave surface toward an image side;

a meniscus third lens having negative refractive power and a convex surface toward the object side;

a fourth lens having positive refractive power and a convex surface toward the image side; and a fifth lens having negative refractive power and a concave surface toward the image side, wherein an image-side surface of the fifth lens has an aspherical shape and has a curvature changing point at a position other than an intersection point between the image-side surface and an optical axis, wherein the curvature changing point is a point on an aspherical surface and is a point at which a tangential plane of a crest of the aspherical surface is perpendicular to the optical axis;

the first lens, the second lens, and the fifth lens are fixed with respect to the imaging surface;

the third lens and the fourth lens are integrally moved in an optical axis direction to focus; and the following conditional expression is satisfied:

$$0.75 < f34/f < 1.30 \quad (1)$$

where:

f34 is a combined focal length of the third lens and the fourth lens; and f is an overall focal length of the imaging lens.

2. The imaging lens of claim 1, wherein the following conditional expression is satisfied:

$$1.35 < f12/f < 1.95 \quad (2)$$

where:

f12 is a combined focal length of the first lens and the second lens.

3. The imaging lens of claim 1, wherein the following conditional expression is satisfied:

$$0.1 < \Sigma L12/f < 0.4 \quad (3)$$

where:

ΣL12 is a distance on the optical axis from an object-side surface of the first lens to an image-side surface of the second lens.

4. The imaging lens of claim 1, wherein an image-side surface of the third lens has an aspherical shape and has a curvature changing point at a position other than an intersection point between the image-side surface of the third lens and the optical axis.

5. The imaging lens of claim 1, wherein the following conditional expression is satisfied:

$$0.15 < |P3|/P < 0.55 \quad (4)$$

where:

P3 is a refractive power of the third lens; and

P is an overall refractive power of the imaging lens.

6. The imaging lens of claim 1, wherein the following conditional expression is satisfied:

$$0.65 < d25/f < 0.95 \quad (5)$$

where:

d25 is a distance on the optical axis from an image-side surface of the second lens to an object-side surface of the fifth lens.

7. The imaging lens of claim 1, wherein comprising:

an aperture stop of the imaging lens is disposed between the first lens and the second lens.

8. The imaging lens of claim 1, wherein an image-side surface of the second lens has an aspherical shape, whose negative refractive power at a position is weaker as the position is farther from the optical axis.

9. The imaging lens of claim 1, wherein the following conditional expression is satisfied:

$$15 < \nu 2 < 31 \quad (6)$$

where:

ν2 is an Abbe number of the second lens.

10. The imaging lens of claim 1, wherein the following conditional expression is satisfied:

$$1.60 < n2 < 2.10 \quad (7)$$

where:

n2 is a refractive index of the second lens.

11. The imaging lens of claim 1, wherein the imaging lens is all made of plastic material.

12. An image pickup apparatus, comprising:

a solid state image sensor configured to photoelectrically convert the subject image; and the imaging lens of claim 1.

13. A portable terminal, comprising:

the image pickup apparatus of claim 12.

* * * * *